(12) United States Patent
Nakajima et al.

(10) Patent No.: US 8,144,128 B2
(45) Date of Patent: Mar. 27, 2012

(54) TOUCH PANEL AND COORDINATES DETECTING METHOD USING TOUCH PANEL

(75) Inventors: Takashi Nakajima, Shinagawa (JP);
Nobuyoshi Shimizu, Shinagawa (JP);
Koichi Kondoh, Shinagawa (JP);
Masanobu Hayama, Shinagawa (JP);
Norio Endo, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 331 days.

(21) Appl. No.: 12/687,934

(22) Filed: Jan. 15, 2010

(65) Prior Publication Data

US 2010/0182277 A1  Jul. 22, 2010

(30) Foreign Application Priority Data

Jan. 19, 2009  (JP) ................................ 2009-009367

(51) Int. Cl.
*G06F 3/041* (2006.01)
(52) U.S. Cl. ........................ 345/173; 345/156
(58) Field of Classification Search .................. 345/156, 345/173–179
See application file for complete search history.

(56) References Cited

FOREIGN PATENT DOCUMENTS

| CN | 1584813 A | 2/2005 |
|---|---|---|
| CN | 101339481 A | 1/2009 |
| JP | 6-035608 | 2/1994 |
| JP | 2004-157620 | 6/2004 |
| JP | 2004-272722 | 9/2004 |
| JP | 2008-293129 | 12/2008 |
| KR | 10-0347439 | 8/2002 |
| WO | WO02/069124 | 9/2002 |

OTHER PUBLICATIONS

Chinese Office Action dated Jul. 19, 2011.
Korean Office Action dated Mar. 25, 2011.

*Primary Examiner* — Ricardo L Osorio
(74) *Attorney, Agent, or Firm* — IPUSA, PLLC

(57) ABSTRACT

A touch panel includes a lower conductive film, four electrodes disposed in edge portions of four sides of the lower conductive film, and an upper conductive film disposed over the lower conductive film so that the upper and lower conductive films are opposed to each other, to detect an electric potential in the lower conductive film when the upper conductive film is in contact with the lower conductive film. The upper conductive film includes split portions containing no transparent conductive material and split conductive portions divided by the split portions. The touch panel is arranged to detect an electric potential of each of contact points in the split conductive portions when the upper and lower conductive films are brought in contact with each other at the contact points, and detect respective coordinates of the contact points based on the electrical potentials.

15 Claims, 21 Drawing Sheets

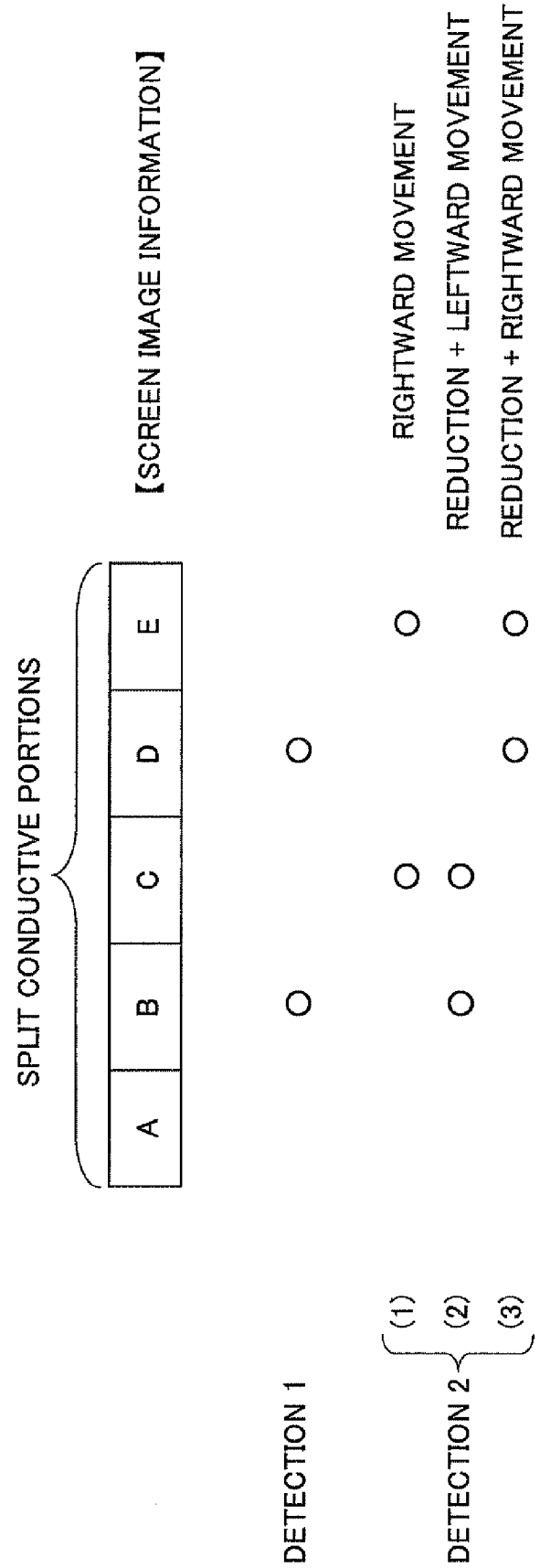

TOUCH PANEL AND COORDINATES DETECTING METHOD USING TOUCH PANEL

BACKGROUND OF THE INVENTION

1. Field of the Invention

This invention relates to a touch panel and a coordinates detecting method using a touch panel.

2. Description of the Related Art

A touch panel is an input device which enables a user to input data directly to a display device. The touch panel is arranged on a front face of the display device and used to input data. The touch panel allows the user to input data directly based on the visual information on the display device, and it has been widely used for various applications.

A resistive-film touch panel is well known in the related art. In the resistive-film touch panel, an upper electrode substrate on which a transparent conductive film is formed and a lower electrode substrate on which a transparent conductive film is formed are disposed so that these transparent conductive films are opposed to each other. When an external force is exerted at a point of the upper electrode substrate of the touch panel, the transparent conductive films are brought in contact with each other at the point, and a position of the point where the force is exerted can be detected by the touch panel.

Roughly speaking, resistive-film touch panels according to the related art may be classified into four-wire type and five-wire type. In a four-wire type touch panel, a pair of X-axis electrodes is provided on one of an upper electrode substrate and a lower electrode substrate, and a pair of Y-axis electrodes is provided on the other of the two electrode substrates. On the other hand, in a five-wire type touch panel, both a pair of X-axis electrodes and a pair of Y-axis electrodes are provided on a lower electrode substrate, and an upper electrode substrate functions as a probe for detecting voltage. For example, Japanese Laid-Open Patent Publication No. 2004-272722 and Japanese Laid-Open Patent Publication. No. 2008-293129 disclose respective resistive-film touch panels of five-wire type according to the related art.

Specifically, a description will be given of a five-wire type touch panel according to the related art with reference to FIGS. 1 and 2. FIG. 1 is a schematic diagram illustrating the composition of the five-wire type touch panel according to the related art. FIG. 2 is a cross-sectional view of the five-wire type touch panel according to the related art.

As illustrated in FIGS. 1 and 2, the five-wire type touch panel 200 includes a film 210 (which is an upper electrode substrate) on which a transparent conductive film 230 is formed, and a glass plate 220 (which is a lower electrode substrate) on which a transparent conductive film 240 is formed. The film 210 and the glass plate 220 are disposed on opposite sides of a spacer 250 so that the transparent conductive film 230 and the transparent conductive film 240 are opposed to each other and separated by the spacer 250. This five-wire type touch panel 200 and a host computer (not illustrated) are electrically connected to each other by a cable 260.

In the five-wire type touch panel 200 according to the related art, electrodes 241, 242, 243 and 244 are disposed in edge portions of the four sides of the transparent conductive film 240, as illustrated in FIG. 3A, and an X-direction voltage and a Y-direction voltage are alternately supplied by using the electrodes 241, 242, 243 and 244. When the transparent conductive film 230 and the transparent conductive film 240 are brought in contact with each other at a contact point A, an electric potential Va of the contact point A is detected through the transparent conductive film 230 as illustrated in FIG. 3B, and the coordinates of the contact point A in the X-axis direction and the Y-direction can be detected.

In a case of the five-wire type touch panel mentioned above, detecting the position of a single contact point is possible. However, when the transparent conductive film 230 and the transparent conductive film 240 are brought in contact with each other at plural contact points simultaneously, it is difficult to detect the positions of the plural contact points accurately. The reason of the difficulty is described as follows.

As illustrated in FIG. 4A, by using the electrodes 241, 242, 243 and 244 disposed in the edge portions of the four sides of the transparent conductive film 240, an X-direction voltage and a Y-direction voltage are alternately supplied. If the transparent conductive film 230 and the transparent conductive film 240 are brought in contact with each other at two contact points A and B, the coordinates of an intermediate point between the point A and the point B will be detected.

The above-described method using the touch panel according to the related art is directed to detecting an electric potential at a contact point between the transparent conductive film 230 and the transparent conductive film 240 in order to detect the coordinates of the contact point. As illustrated in FIG. 4B, even when the transparent conductive films 230 and 240 are brought in contact with each other at the two contact points A and B simultaneously, only an electrical potential Vc at the intermediate point between the point A and the point B is detected through the transparent conductive films 230 and 240. Hence, the above-described method determines from the detected potential Vc inaccurately that the transparent conductive films 230 and 240 are in contact only at the intermediate point.

SUMMARY OF THE INVENTION

In one aspect of the invention, the present disclosure provides a touch panel and a coordinates detecting method using a touch panel which are able to detect, even when the touch panel is depressed at plural contact points simultaneously, respective positions of the contact points.

In one aspect of the invention, the present disclosure provides a touch panel and a coordinates detecting method using a touch panel which are able to detect, even when the contact point is moved on the touch panel, a position of the contact point after the movement.

In an embodiment of the invention which solves or reduces one or more of the above-mentioned problems, the present disclosure provides a touch panel including: a lower conductive film of a transparent conductive material formed on a substrate of an insulating material; four electrodes disposed in edge portions of four sides of the lower conductive film in order to generate a potential distribution in the lower conductive film; and an upper conductive film of the transparent conductive material disposed over the lower conductive film so that the upper conductive film and the lower conductive film are opposed to each other to detect an electric potential in the lower conductive film when the upper conductive film is in contact with the lower conductive film, wherein the upper conductive film includes a plurality of split portions containing no transparent conductive material and a plurality of split conductive portions divided by the plurality of split portions and containing the transparent conductive material, and wherein the touch panel is arranged to detect an electric potential of each of contact points in the plurality of split conductive portions when the upper and lower conductive films are brought in contact with each other at the contact points, so that respective coordinates of the contact points are detected based on the detected electrical potentials.

In an embodiment of the invention which solves or reduces one or more of the above-mentioned problems, the present disclosure provides a coordinates detecting method including: providing a touch panel including a lower conductive film of a transparent conductive material formed on a substrate of an insulating material, four electrodes disposed in edge portions of four sides of the lower conductive film in order to generate a potential distribution in the lower conductive film, and an upper conductive film of the transparent conductive material disposed over the lower conductive film so that the upper and lower conductive films are opposed to each other, the upper conductive film including split portions containing no transparent conductive material and split conductive portions divided by the split portions and containing the transparent conductive material; detecting an electric potential of each of contact points in the split conductive portions when the upper and lower conductive films are brought in contact with each other at the contact points; and detecting respective coordinates of the contact points based on the detected electrical potentials.

BRIEF DESCRIPTION OF THE DRAWINGS

FIG. 26 is a diagram for explaining the coordinates detecting method of the sixth embodiment.

DETAILED DESCRIPTION OF THE PREFERRED EMBODIMENTS

A description will be given of embodiments of the invention with reference to the drawings.

Figure 1:
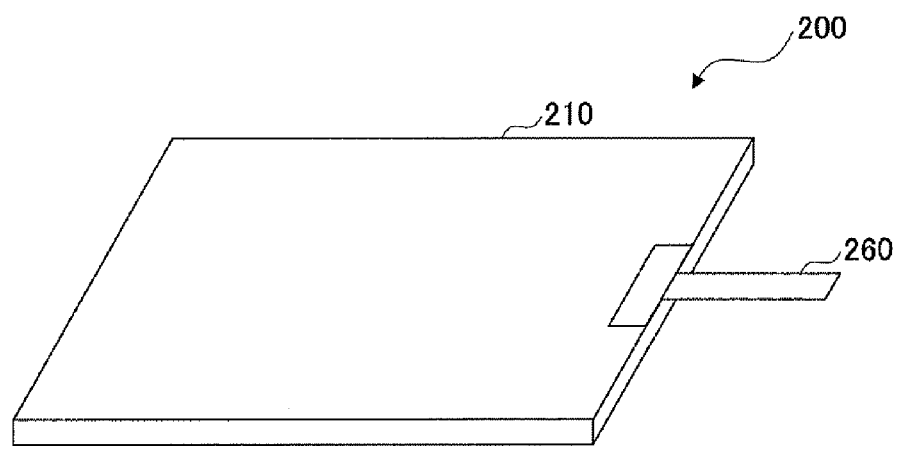
FIG. 1 is a schematic diagram illustrating the composition of a five-wire type touch panel according to the related art.
Figure 2:
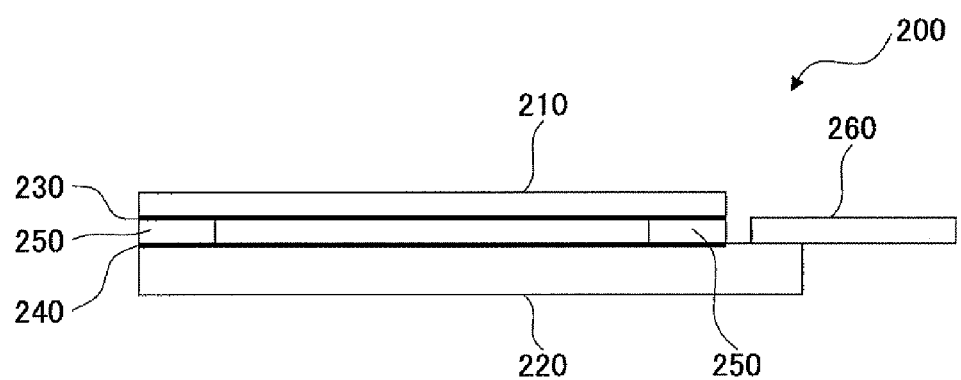
FIG. 2 is a cross-sectional view of the five-wire type touch panel according to the related art.
Figure 3B:
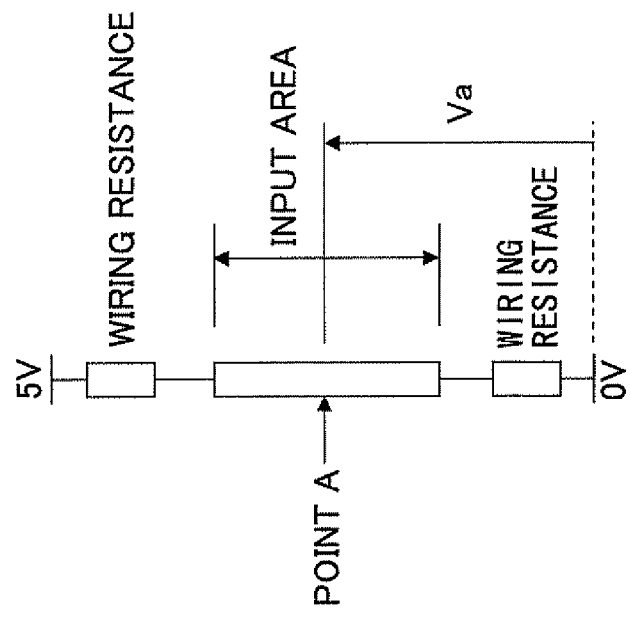
FIG. 3A and FIG. 3B are diagrams for explaining a coordinates detecting method using the five-wire type touch panel according to the related art.
Figure 3A:
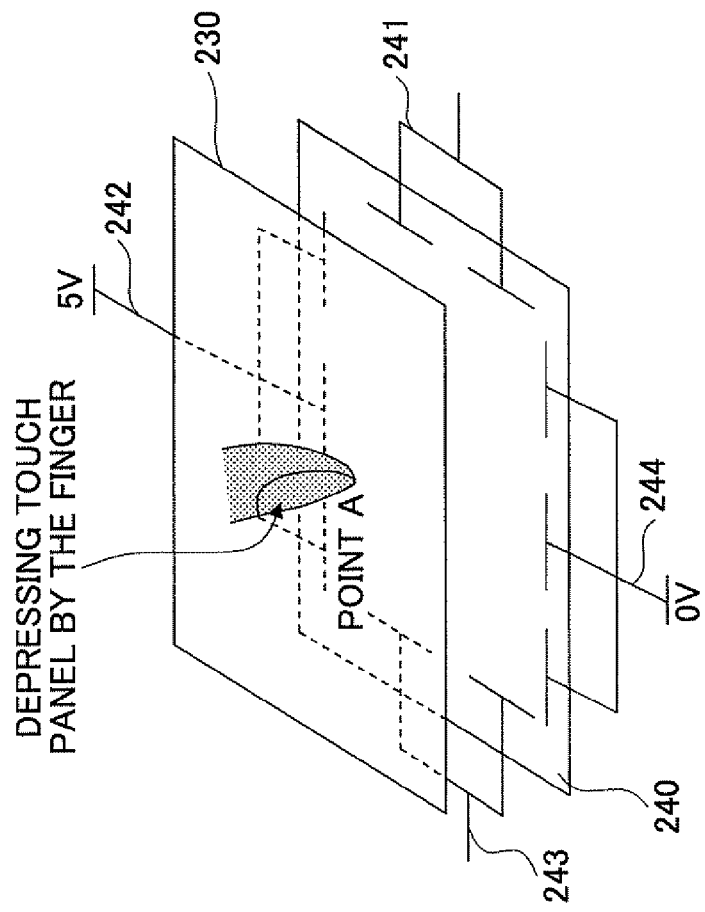
Figure 4B:
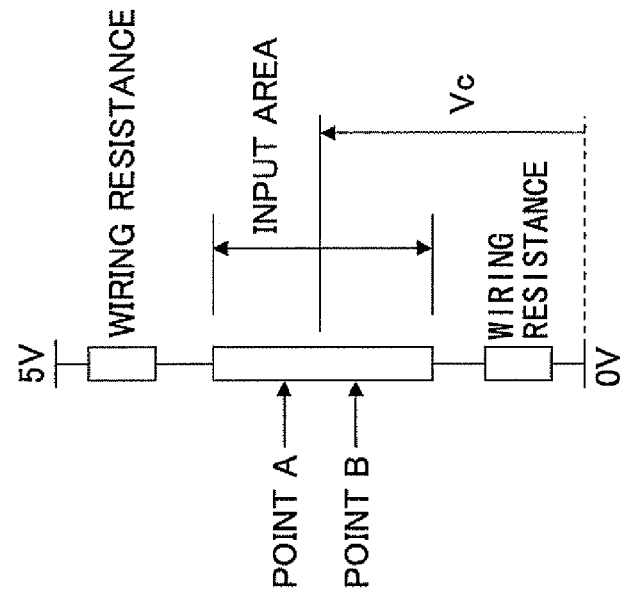
FIG. 4A and FIG. 4B are diagrams for explaining the problem of the coordinates detecting method using the five-wire type touch panel according to the related art.
Figure 4A:
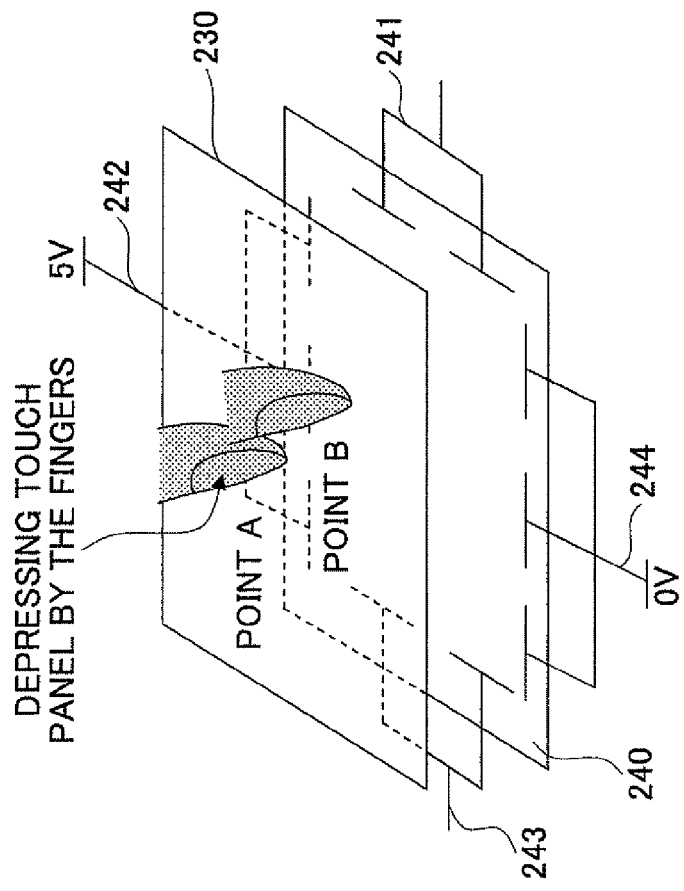
Figure 5:
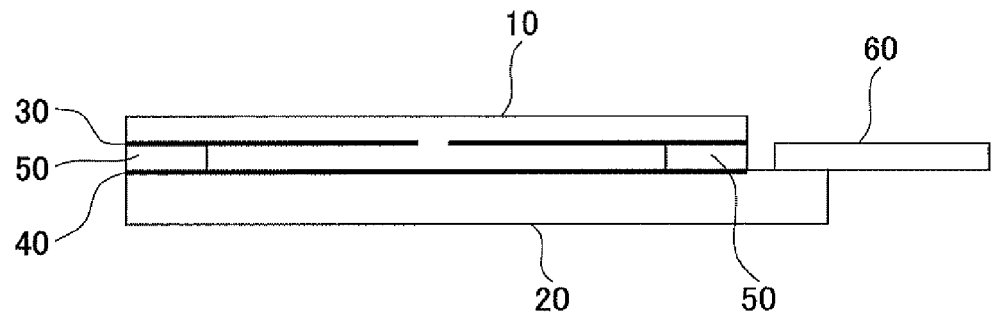
FIG. 5 is a cross-sectional view of a touch panel of a first embodiment of the invention.
Figure 6:
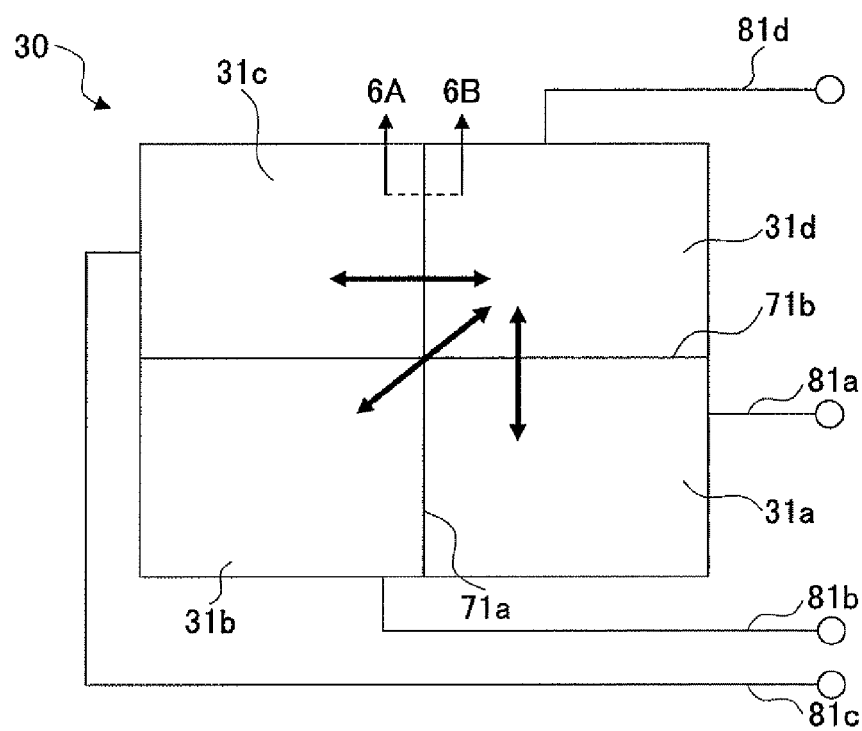
FIG. 6 is a diagram illustrating the composition of an upper electrode substrate of the touch panel of the first embodiment.

FIG. 5 is a cross-sectional view of a touch panel of a first embodiment of the invention. FIG. 6 is a diagram illustrating the composition of an upper electrode substrate in the touch panel of this embodiment.

As illustrated in FIGS. 5 and 6, the touch panel of this embodiment generally includes a film 10 (which is an upper electrode substrate) in which a transparent conductive film 30 is formed on one surface thereof, and a glass plate 20 (which is a lower electrode substrate) in which a transparent conductive film 40 is formed on one surface thereof. In the touch panel of this embodiment, the transparent conductive film 30 (which is an upper conductive film) and the transparent conductive film 40 (which is a lower conductive film) are disposed so that the two transparent conductive films are opposed to each other and separated by a spacer 50. The touch panel of this embodiment and a host computer (not illustrated) are electrically connected to each other by a cable 60.

In the present embodiment, both the transparent conductive film 30 and the transparent conductive film 40 are made of a transparent conductive material. Alternatively, the transparent conductive film 30 may be made of an opaque conductive material which light does not penetrate, instead of the transparent conductive material. Alternatively, the transparent conductive film 40 may be made of an opaque conductive material which light does not penetrate, instead of the transparent conductive material. Alternatively, both the transparent conductive film 30 and the transparent conductive film 40 may be made of an opaque conductive material which light does not penetrate, instead of the transparent conductive material.

In the present embodiment, the transparent conductive film 30 provided on the film 10 (which is the upper electrode substrate) is divided into conductive portions 31a, 31b, 31c and 31d by split portions 71a and 71b which are formed by removing the transparent conductive film 30. Electrodes 81a, 81b, 81c and 81d are connected to the split conductive portions 31a, 31b, 31c and 31d, respectively. When the split conductive portions 31a, 31b, 31c and 31d are in contact with the transparent conductive film 40, detecting the coordinates of respective contact points in the split conductive portions 31a, 31b, 31c and 31d is possible. For this reason, even when the transparent conductive film 30 and the transparent conductive film 40 are brought in contact with each other at plural contact points (or when the plural conductive portions and the transparent conductive film 40 are brought in contact simultaneously), the respective positions of the conductive portions which are brought in contact with the transparent conductive film 40 can be detected. Moreover, by detecting the potential distribution in the transparent conductive film 40, it is possible to detect the coordinates of the contact points with good accuracy.

When a contact point between the transparent conductive film 40 and the transparent conductive film 30 is moved on the transparent conductive film 30 in the direction indicated by any of the arrows in FIG. 6, the movement of the contact point can also be detected. By detecting the potential distribution in the transparent conductive film 40, it is also possible to detect the coordinates of the contact point after the movement.

It is preferred that the width of each of the split portions formed is equal to or smaller than 1 mm. If the width of each of the split portions formed in the touch panel is large, the area of the undetectable portions will be increased, which will interfere with the normal function of the touch panel. It is assumed that an object that is in contact with the touch panel is a finger or a stylus, and the size of a stylus is about 0.8 mm in radius. Therefore, if the width of each split portion is equal to or smaller than 1 mm, it is conceivable that the split portion will not be detrimental to the normal function of the touch panel.

Figure 7:
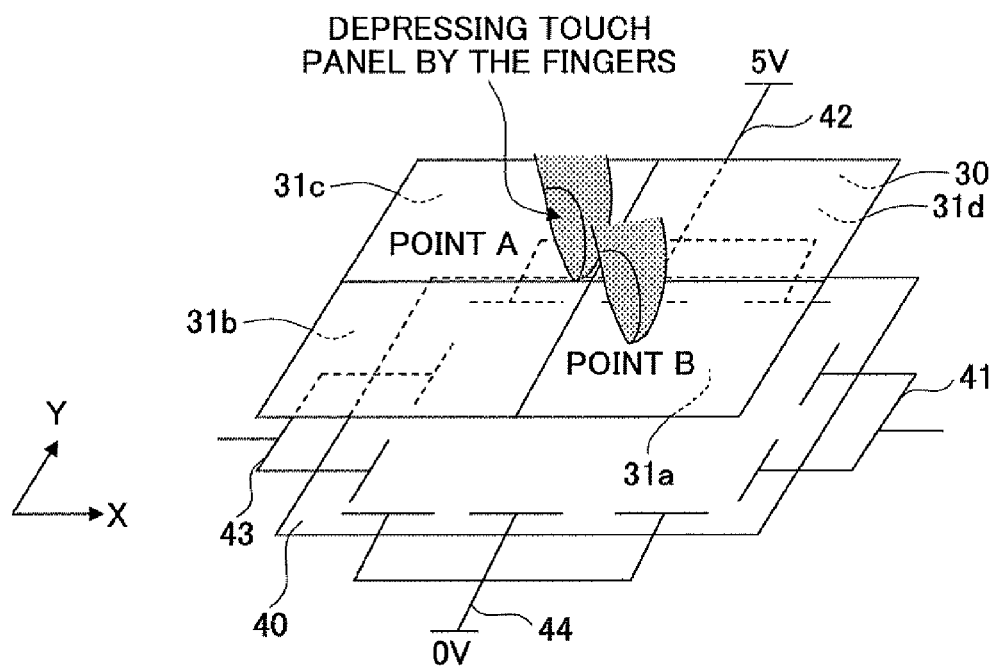
FIG. 7 is a diagram for explaining a coordinates detecting method using the touch panel of the first embodiment.

FIG. 7 illustrates a condition in which the transparent conductive film 30 and transparent conductive film 40 are brought in contact with each other at two contact points A and B in the touch panel of this embodiment. An X-direction voltage and a Y-direction voltage are alternately supplied by using the electrodes 41, 42, 43 and 44 disposed in the edge portions of the four sides of the transparent conductive film 40 on the glass plate 20 which is the lower electrode substrate.

As illustrated in FIG. 7, the contact point A between the transparent conductive film 30 and the transparent conductive film 40 is located in the conductive portion 31c, and the contact point B between the transparent conductive film 30 and the transparent conductive film 40 is located in the conductive portion 31a. For this reason, the contact point A and the contact point B are independently detected from the conductive portion 31c and the conductive portion 31a. Therefore, in the touch panel of this embodiment, even when the transparent conductive film 30 and the transparent conductive film 40 are brought in contact with each other at plural contact points, it is possible to detect the positions of the respective contact points simultaneously.

Figure 8:
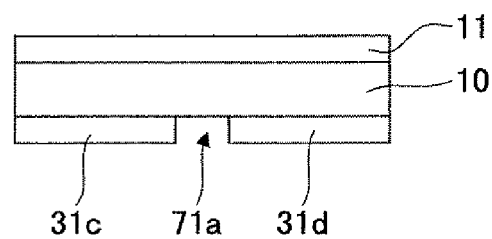
FIG. 8 is a cross-sectional view of the upper electrode substrate taken along the dotted line 6A-6B indicated in FIG. 6.

FIG. 8 is a cross-sectional view of the upper electrode substrate taken along the dotted line 6A-6B indicated in FIG. 6. As illustrated in FIG. 8, the transparent conductive film 30 is divided into the conductive portions 31c and 31d by the split portion 71a which is formed by removing the transparent conductive film 30.

The split portions 71a and 71b may be formed by using one of the known forming methods as in the following. One forming method is that a portion of the transparent conductive film 30 is irradiated by a laser beam and the irradiated portion is removed from the transparent conductive film 30 by heat. Another forming method is that a photoresist is applied to a surface of the transparent conductive film 30, the photoresist is subjected to exposure and development by using an exposure device, a resist pattern is formed only in the conductive portions 31a, 31b, 31c and 31d, and portions of the transparent conductive film 30 where the resist pattern is not formed are removed by dry etching or wet etching. Still another forming method is that an etching paste is printed to the portions of the transparent conductive film 30 corresponding to the split portions 71a and 71b, and the printed portions of the transparent conductive film 30 are removed to form the split portions 71a and 71b.

In the upper electrode substrate of the touch panel of this embodiment, a hard coat layer 11 is formed on a surface of the film 10 opposite to the surface thereof on which the transparent conductive film 30 is formed, as illustrated in FIG. 8.

Figure 9:
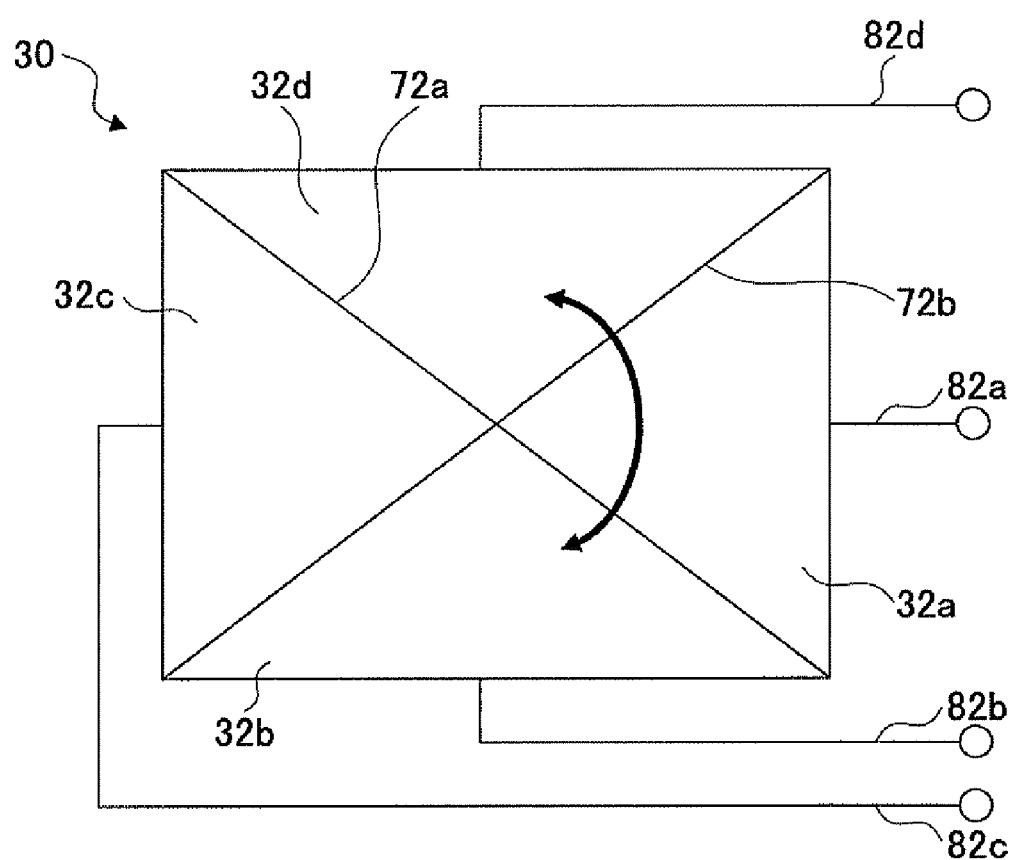
FIG. 9 is a diagram illustrating the composition of a modification of the upper electrode substrate of the touch panel of the first embodiment.

Alternatively, the touch panel of this embodiment may be arranged so that the split portions 72a and 72b are formed on diagonal lines of the film 10 (which is the upper electrode substrate), as illustrated in FIG. 9. With these split portions 72a and 72b, the split conductive portions 32a, 32b, 32c and 32d are formed in the transparent conductive layer 30. The electrodes 82a, 82b, 82c and 82d are connected to the conductive portions 32a, 32b, 32c and 32d, respectively. When the contact point is moved as indicated by the arrow in FIG. 9, the coordinates of the contact point after the movement can be detected by the touch panel 30 illustrated in FIG. 9. For a certain application of the touch panel, it is preferred to form the conductive portions into the configuration as illustrated in FIG. 9.

Figure 10:
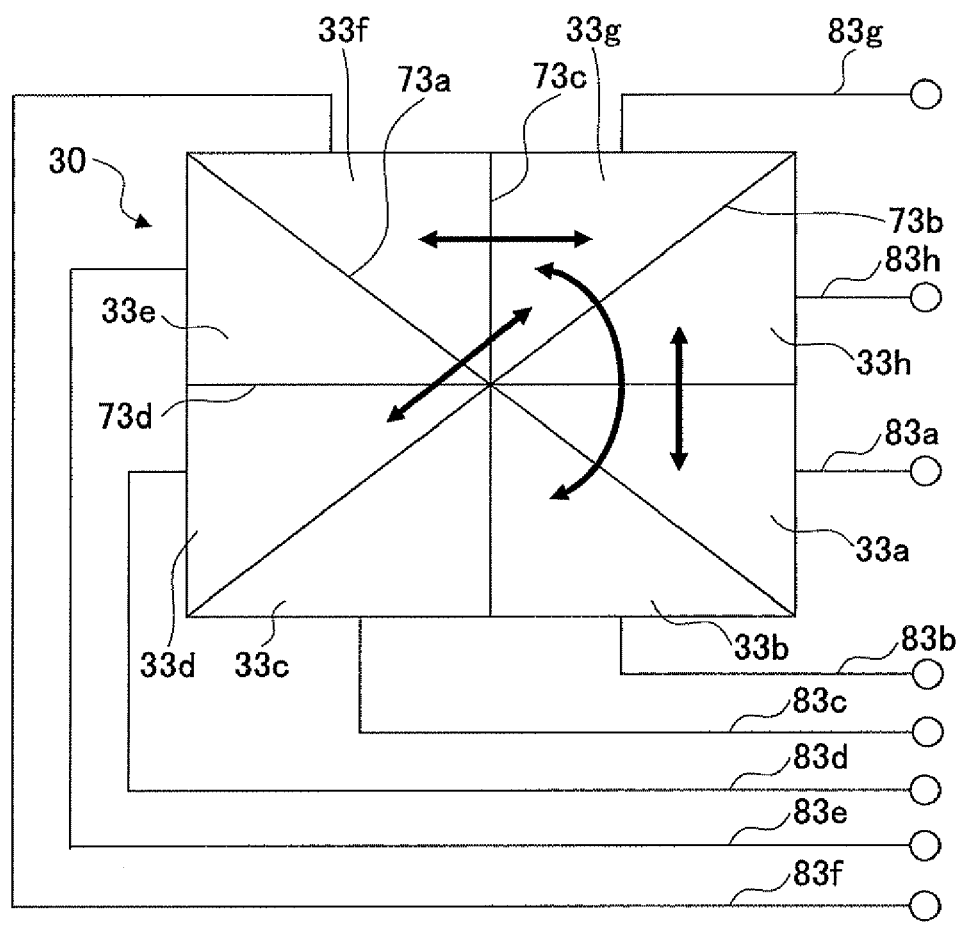
FIG. 10 is a diagram illustrating the composition of a modification of the upper electrode substrate of the touch panel of the first embodiment.

Alternatively, the touch panel of this embodiment may be arranged so that split portions 73a and 73b and split portions 73c and 73d are formed on the diagonal lines of the film 10 (which is the upper electrode substrate) and along the sides of the film 10 respectively, as illustrated in FIG. 10. With the split portions 73a, 73b, 73c and 73d, the split conductive portions 33a, 33b, 33c, 33d, 33e, 33f, 33g and 33h are formed in the transparent conductive layer 30. The electrodes 83a, 83b, 83c, 83d, 83e, 83f, 83g and 83h are connected to the conductive portions 33a, 33b, 33c, 33d, 33e, 33f, 33g and 33h, respectively. When the contact point is moved as indicated by any of the arrows in FIG. 10, the coordinates of the contact point after the movement can be detected. With the increased number of the split conductive portions, detecting the coordinates of the contact point with better accuracy is possible.

Next, a description will be given of a second embodiment of the invention.

Figure 11:
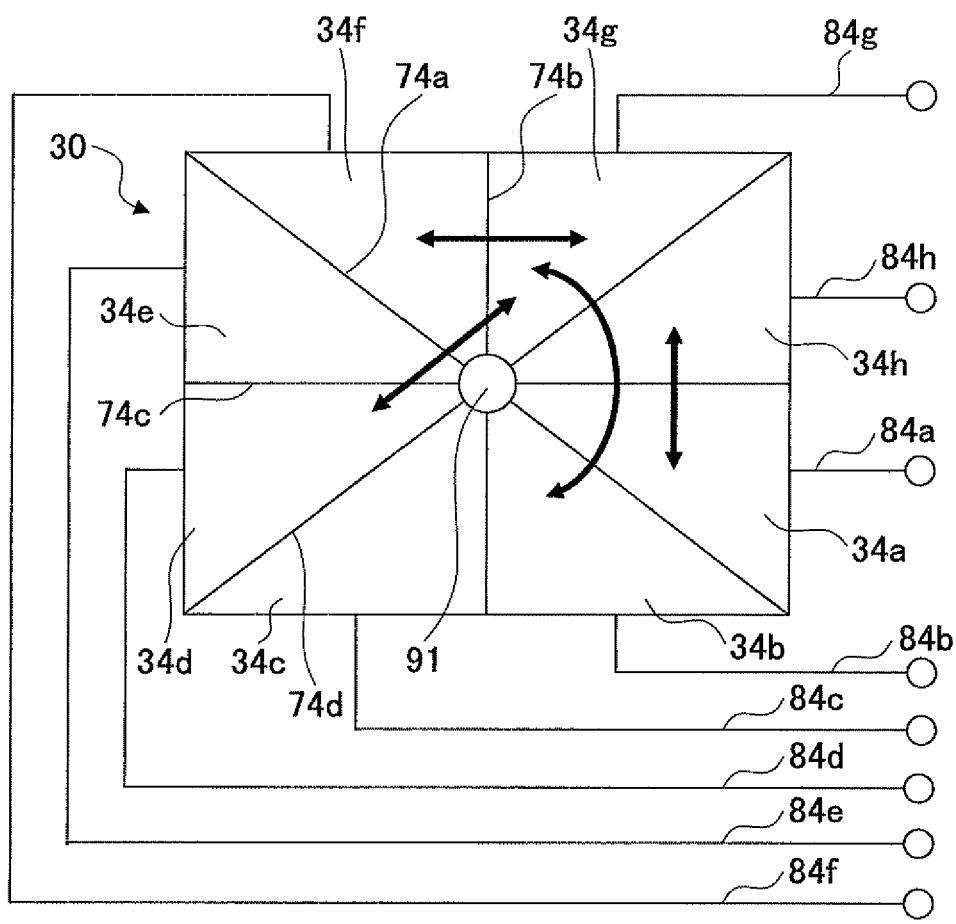
FIG. 11 is a diagram illustrating the composition of an upper electrode substrate of a touch panel of a second embodiment of the invention.

FIG. 11 is a diagram illustrating the composition of an upper electrode substrate of a touch panel of the second embodiment.

As illustrated in FIG. 11, the transparent conductive film 30 in the upper electrode substrate of the touch panel of this embodiment includes split portions 74a, 74b, 74c and 74d which are formed in the shape of a straight line by removing the transparent conductive film 30, and includes a transparent-conductive-film removed portion 91 which is formed in the shape of a circle at a location in the center of the transparent conductive film 30.

In a vicinity of the center location where the split portions 74a, 74b, 74c and 74d intersect each other, the density of the split conductive portions is comparatively large, and detecting the coordinates of contact points there is difficult. By using the transparent-conductive-film removed portion 91 formed at the center location, it is possible to prevent fluctuation of the position detection at the center location.

In the touch panel of this embodiment, with the split portions 74a, 74b, 74c and 74d, the spilt conductive portions 34a, 34b, 34c, 34d, 34e, 34f, 34g and 34h are formed in the transparent conductive layer 30, and the electrodes 84a, 84b, 84c, 84d, 84e, 84f, 84g and 84h are connected to the split conductive portions 34a, 34b, 34c, 34d, 34e, 34f, 34g and 34h, respectively. When the contact point is moved as indicated by any of the arrows in FIG. 11, the coordinates of the contact point after the movement can be detected by the touch panel of this embodiment. The structure of the touch panel of this embodiment other than described above is essentially the same as that of the first embodiment.

Next, a description will be given of a third embodiment of the invention.

Figure 12:
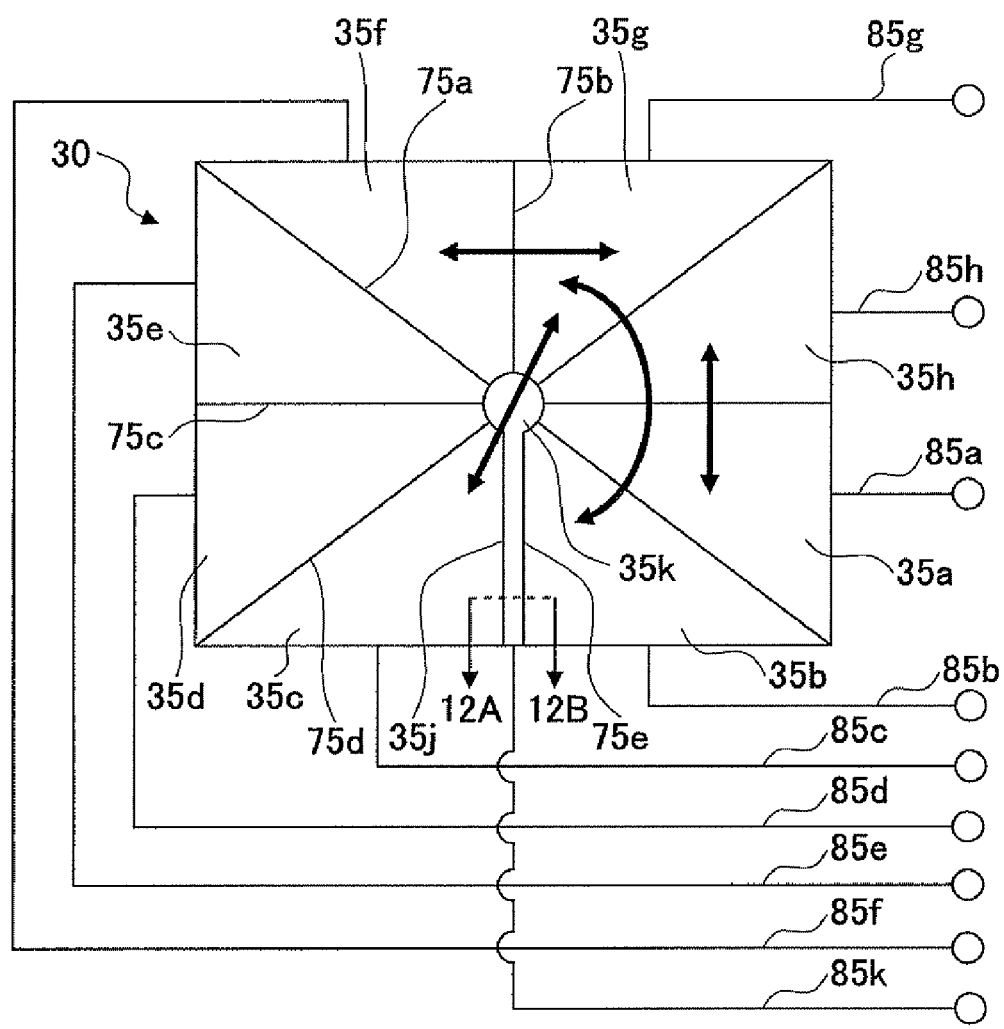
FIG. 12 is a diagram illustrating the composition of an upper electrode substrate of a touch panel of a third embodiment of the invention.

FIG. 12 is a diagram illustrating the composition of an upper electrode substrate of the touch panel of this embodiment.

As illustrated in FIG. 12, the transparent conductive film 30 in the upper electrode substrate of the touch panel of this embodiment includes split portions 75a, 75b, 75c and 75d which are formed in the shape of a straight line by removing the transparent conductive film 30, and includes a split portion 75e which is formed with a circular conductive portion 35k in the center of the transparent conductive film 30 and with a lead conductive portion 35j extending from the circular conductive portion 35k to an end of the transparent conductive film 30. In a vicinity of the central location where the split portions 75a, 75b, 75c and 75d intersect each other, the density of the split conductive portions is comparatively large, and detecting the coordinates of the contact points is difficult. By using the circular conductive portion 35k of the split portion 75e, it is possible to prevent fluctuation of the position detection.

Figure 13:
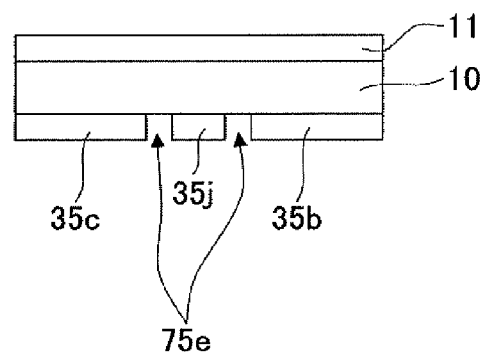
FIG. 13 is a cross-sectional view of the upper electrode substrate taken along the dotted line 12A-12B indicated in FIG. 12.

FIG. 13 is a cross-sectional view of the upper electrode substrate taken along the dotted line 12A-12B indicated in FIG. 12. As illustrated in FIG. 13, by the split portion 75e in which the transparent conductive film 30 is removed, the transparent conductive film 30 is divided into the split conductive portions 35b, 35c and the lead conductive portion 35j.

In the upper electrode substrate of the touch panel of this embodiment, a hard coat layer 11 is formed on the surface of the film 10 opposite to the surface thereof on which the transparent conductive film 30 is formed, as illustrated in FIG. 13.

In the upper electrode substrate of the touch panel of this embodiment, with the split portions 75a, 75b, 75c, 75d and 75e which are formed by removing the transparent conductive film 30, the split conductive portions 35a, 35b, 35c, 35d, 35e, 35f, 35g, 35h, 35k and 35j are formed. Electrodes 85a, 85b, 85c, 85d, 85e, 85f, 85g, 85h and 85k are connected to the split conductive portions 35a, 35b, 35c, 35d, 35e, 35f, 35g, 35h and 35k (or 35j), respectively. When the split conductive portions 35a-35k are in contact with the transparent conductive film 40, electric potentials of the respective contact points in the split conductive portions 35a-35k can be detected independently. Accordingly, when the contact point is moved in the direction indicated by any of the arrows indicated in FIG. 12, the coordinates of the contact point after the movement can be detected. The structure of the touch panel of this embodiment other than described above is essentially the same as that of the first embodiment.

Next, a description will be given of a fourth embodiment of the invention.

Figure 14:
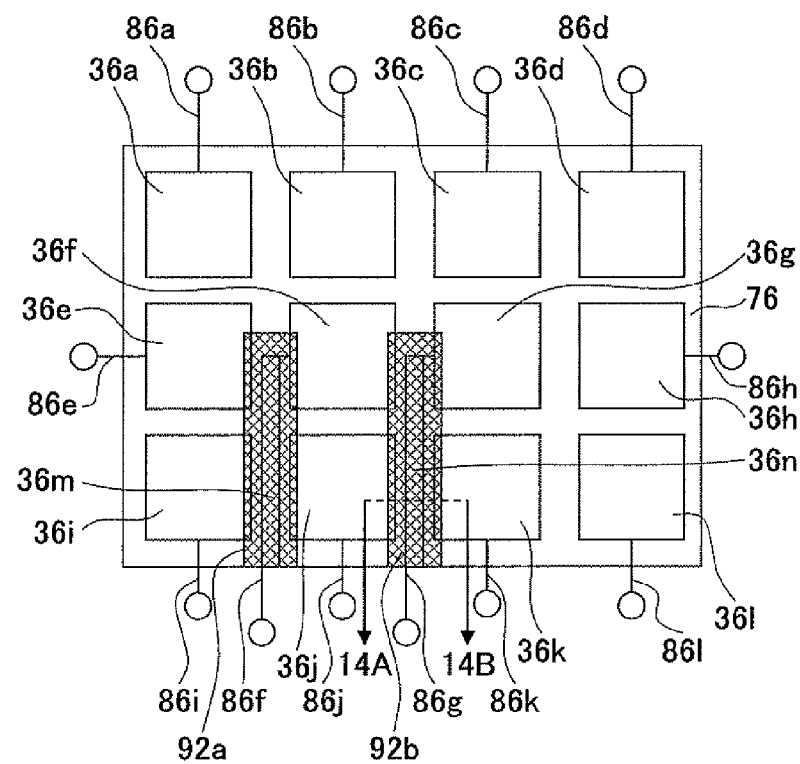
FIG. 14 is a diagram illustrating the composition of an upper electrode substrate of a touch panel of a fourth embodiment of the invention.
Figure 15:
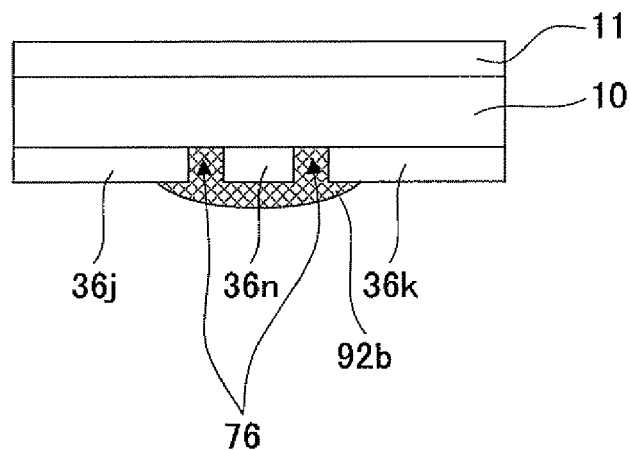
FIG. 15 is a cross-sectional view of the upper electrode substrate taken along the dotted line 14A-14B indicated in FIG. 14.

FIG. 14 is a diagram illustrating the composition of an upper electrode substrate of a touch panel of this embodiment. FIG. 15 is a cross-sectional view of the upper electrode substrate taken along the dotted line 14A-14B indicated in FIG. 14.

As illustrated in FIGS. 14 and 15, the transparent conductive film 30 in the upper electrode substrate of the touch panel of this embodiment includes split portions 76 which are formed in a grid pattern in both the X-axis direction and the Y-axis direction by removing the transparent conductive film 30. With the split portions 76, the transparent conductive film 30 is divided into the split conductive portions 36a, 36b, 36c, 36d, 36e, 36f, 36g, 36h, 36i, 36j, 36k and 36l. Electrodes 86a, 86b, 86c, 86d, 36e, 86f, 86g, 86h, 86i, 86j, 86k and 86l are connected to the split conductive portions 36a, 36b, 36c, 36d, 36e, 36f, 36g, 36h, 36i, 36j, 36k and 36l, respectively. When the split conductive portions 36a-36l are in contact with the transparent conductive film 40, electrical potentials of the respective contact points in the split conductive portions 36a-36l can be detected independently.

In this embodiment, the split conductive portions 36f and 36g are located in the center location of the upper electrode substrate 10, and a lead conductive portion 36m extending from the split conductive portion 36f to the split conductive portion 36j and a lead conductive portion 36n extending from the split conductive portion 36g to the split conductive portion 36k are formed. The lead conductive portions 36m and 36n are connected to the split conductive portions 36f and 36g, respectively. Furthermore, insulating layers 92a and 92b are formed on the lead conductive portions 36m and 36n respectively, to prevent the lead conductive portions 36m and 36n from being in contact with the opposing transparent conductive film 40. When the contact point is moved, the coordinates of the contact point after the movement can be detected. The structure of the touch panel of this embodiment other than described above is essentially the same as that of the first embodiment.

Next, a description will be given of a fifth embodiment of the invention.

Figure 16:
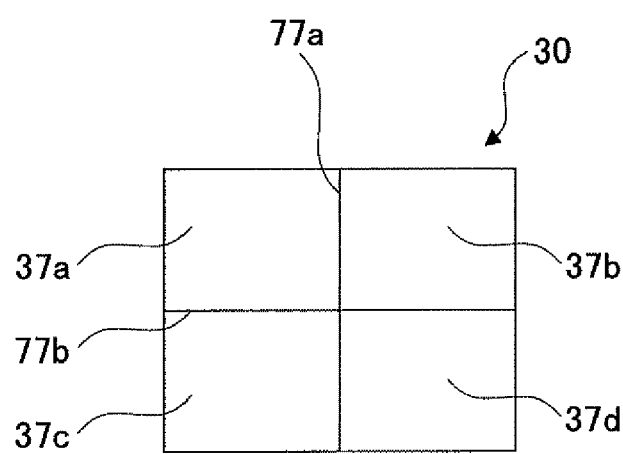
FIG. 16 is a diagram illustrating the composition of an upper electrode substrate of a touch panel of a fifth embodiment of the invention.
Figure 17:
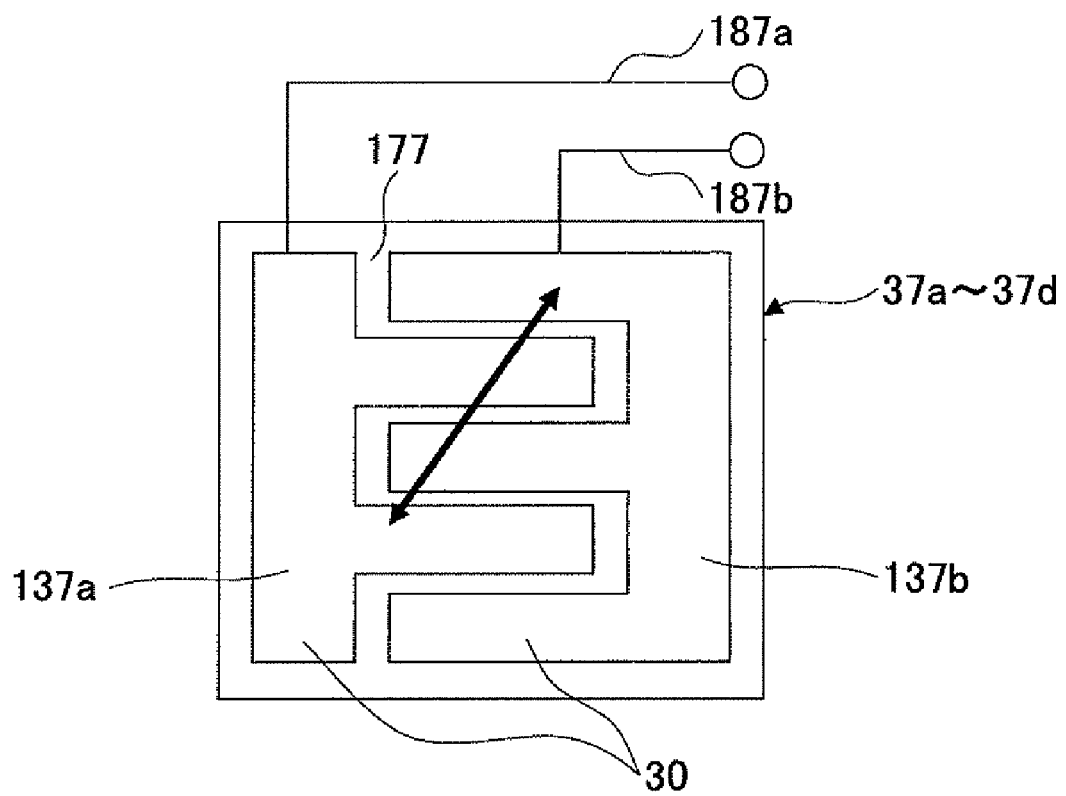
FIG. 17 is a diagram illustrating the composition of a split conductive portion of the upper electrode substrate of the touch panel of the fifth embodiment.

FIG. 16 is a diagram illustrating the composition of an upper electrode substrate of a touch panel of the fifth embodiment. FIG. 17 is a diagram illustrating the composition of a split conductive portion of the upper electrode substrate of the touch panel of the fifth embodiment. The touch panel of this embodiment is arranged so that each of the split conductive portions of the transparent conductive film 30 is divided further in a unique manner.

Specifically, as illustrated in FIGS. 16 and 17, the transparent conductive film 30 in the upper electrode substrate of the touch panel of this embodiment includes split portions 77a and 77b which are formed by removing the transparent conductive film 30. With the split portions 77a and 77b, the transparent conductive film 30 is divided into split conductive portions 37a, 37b, 37c and 37d. Each of the split conductive portions 37a, 37b, 37c and 37d is further divided into comb-shaped conductive portions 137a and 137b by a split portion 177 which is formed by removing the transparent conductive film 30. Electrodes 187a and 187b are connected to the comb-shaped conductive portions 137a and 137b, respectively. Even when a contact point between the transparent conductive film 30 and the transparent conductive film 40 which are opposed to each other is moved by a small displacement in the direction indicated by the arrow in FIG. 17, it is possible to detect the coordinates of the contact point after the movement.

Figure 18:
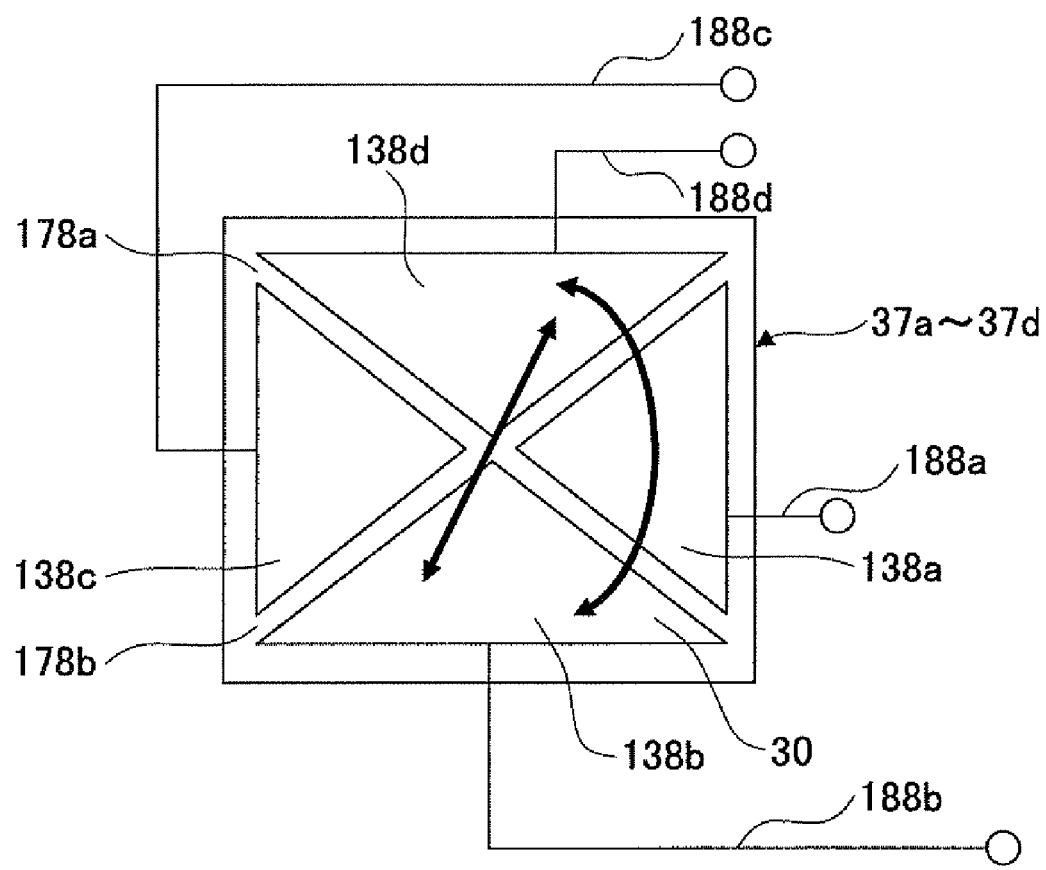
FIG. 18 is a diagram illustrating the composition of another split conductive portion in the touch panel of the fifth embodiment.

FIG. 18 is a diagram illustrating the composition of another split conductive portion of the touch panel of the fifth embodiment. In this example, each of the split conductive portions 37a, 37b, 37c and 37d illustrated in FIG. 16 is divided further. Specifically, the transparent conductive film 30 in each of the split conductive portions 37a, 37b, 37c and 37d is divided into triangular conductive portions 138a, 138b, 138c and 138d by split portions 178a and 178b which are formed by removing the transparent conductive film 30. Electrodes 188a, 188b, 188c and 188d are connected to the triangular conductive portions 138a, 138b, 138c and 138d, respectively. Even when a contact point between the transparent conductive film 30 and the transparent conductive film 40 which are opposed to each other is moved by a small displacement in the direction indicated by any of the arrows in FIG. 18, it is possible to detect the coordinates of the contact point after the movement.

Figure 19:
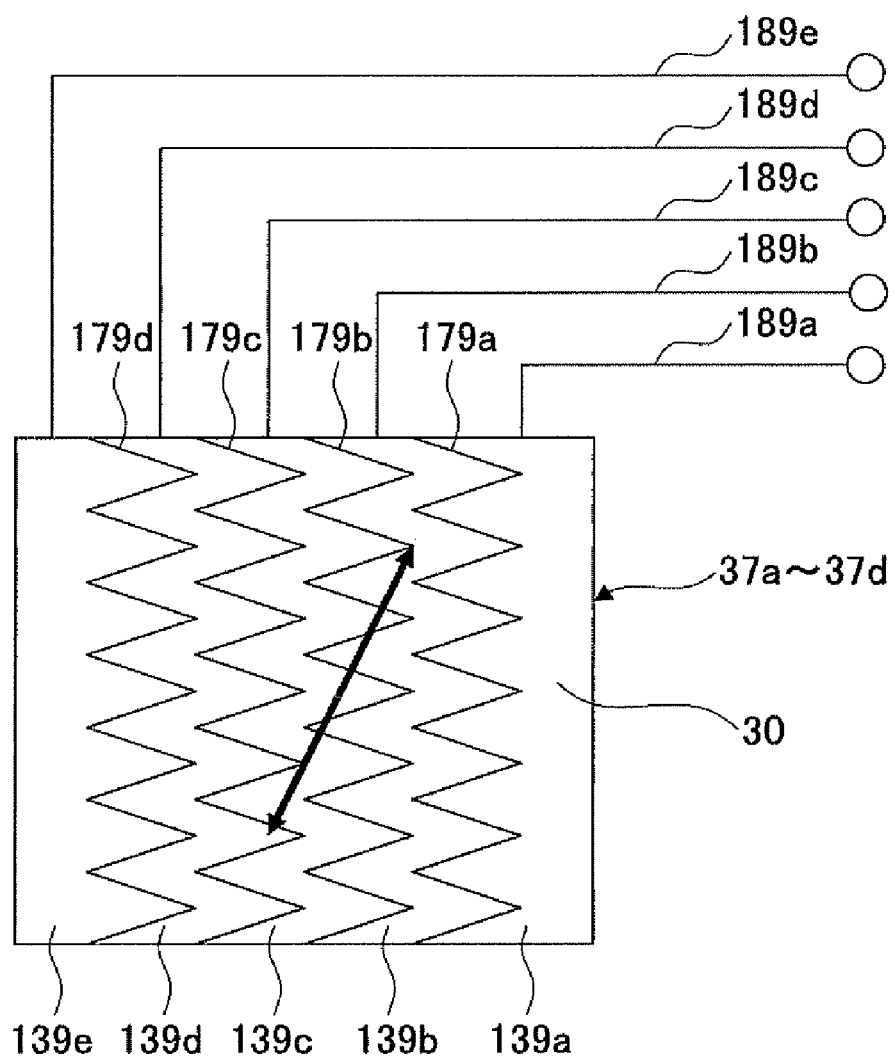
FIG. 19 is a diagram illustrating the composition of another split conductive portion in the touch panel of the fifth embodiment.

FIG. 19 is a diagram illustrating the composition of another split conductive portion of the touch panel of the fifth embodiment. In this example, each of the split conductive portions 37a, 37b, 37c and 37d illustrated in FIG. 16 is divided further. Specifically, the transparent conductive film 30 in each of the split conductive portions 37a, 37b, 37c and 37d is divided into conductive portions 139a, 139b, 139c, 139d and 139e by sawtooth-shape split portions 179a, 179b, 179c and 179d which are formed by removing the transparent conductive film 30. Electrodes 189a, 189b, 189c, 189d and 189e are connected to the conductive portions 139a, 139b, 139c, 139d and 139e, respectively. Even when a contact point between the transparent conductive film 30 and the transparent conductive film 40 is moved by a small displacement in the direction indicated by the arrow in FIG. 19, it is possible to detect the coordinates of the contact point after the movement.

The optimal structure for the position detection may be obtained by adjusting the depth of each sawtooth in the configuration of the split portions 179a, 179b, 179c and 179d. For example, with an increased depth of each sawtooth in the configuration of the split portions, it is possible to accurately detect the coordinates of a contact point after the contact point is moved by a very small displacement.

Figure 20:
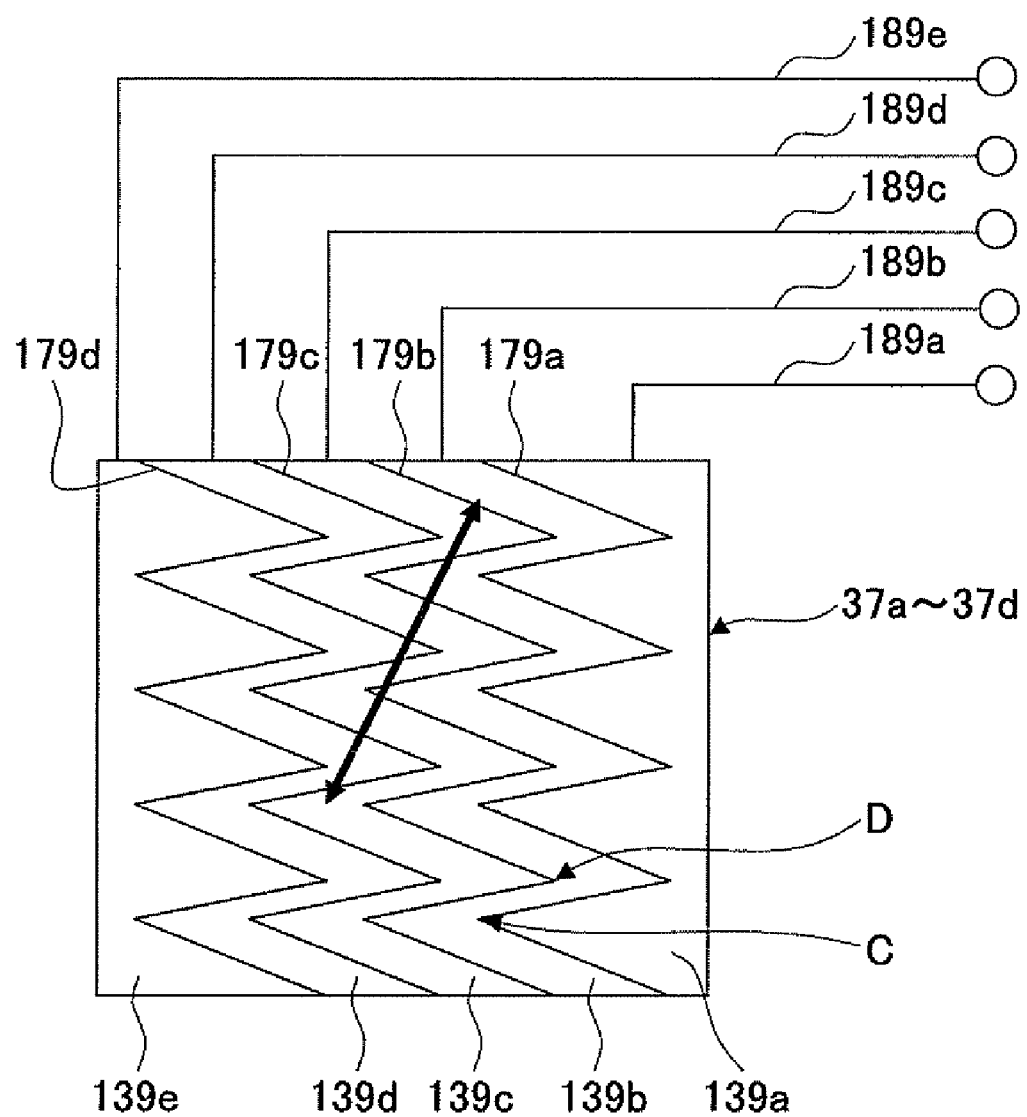
FIG. 20 is a diagram illustrating the composition of a modification of the split conductive portion illustrated in FIG. 19.

Specifically, as illustrated in FIG. 20, the split portions 179a, 179b, 179c and 179d may be formed so that a point C of the conductive portion 139a, in the region where the conductive portions 139a and 139b overlap each other with respect to the transverse direction, is located on the left side of a point D of the conductive portion 139b. With the touch panel of this example, it is possible to detect with good accuracy the coordinates of a contact point after the contact point is moved by a very small displacement. The structure of the touch panel of this example other than described above is essentially the same as that of the first embodiment.

Next, a description will be given of a sixth embodiment of the invention. This embodiment provides a coordinates detecting method using the touch panel according to the invention.

Figure 21:
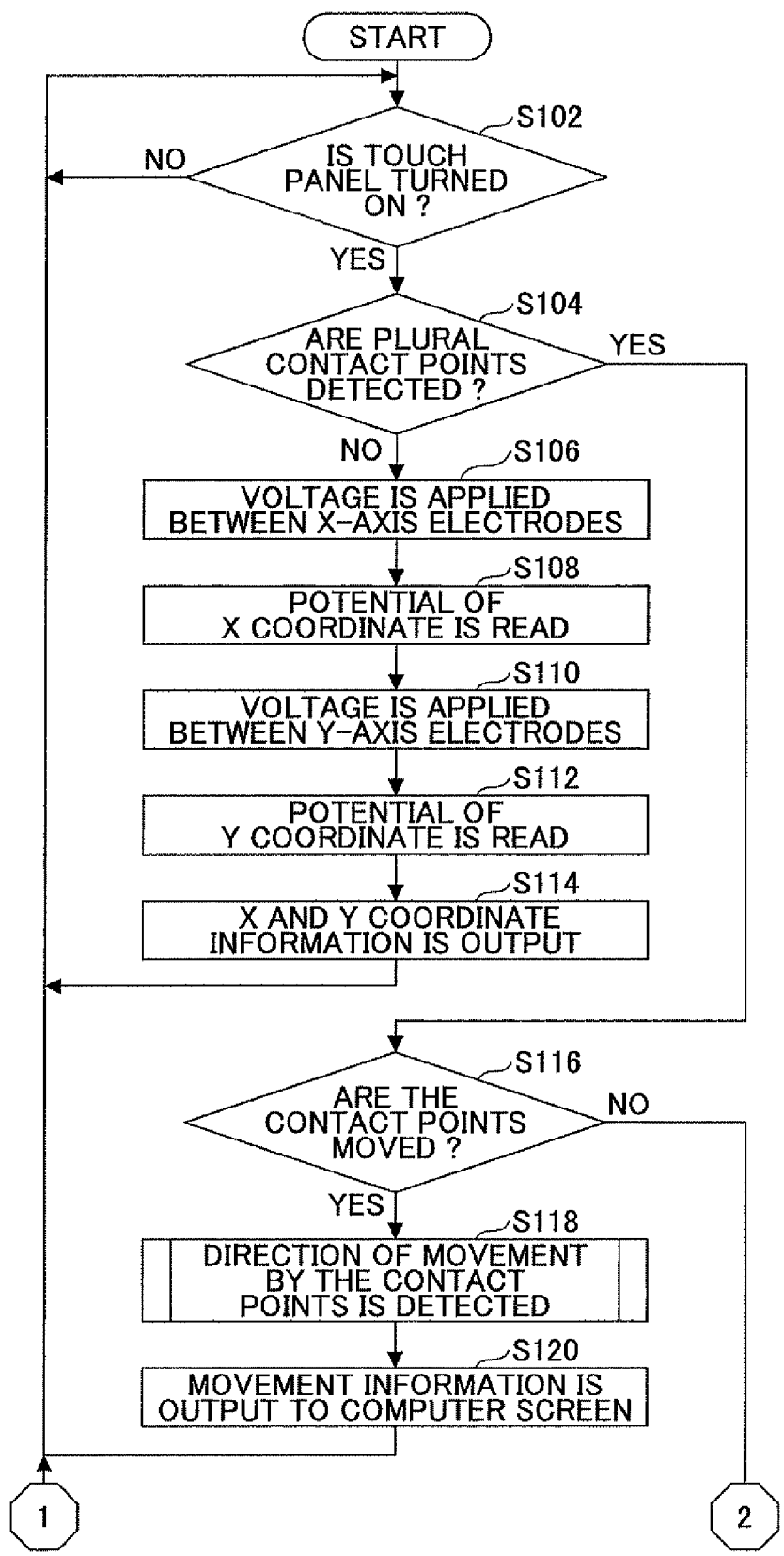
FIG. 21 is a flowchart for explaining a coordinates detecting method of a sixth embodiment of the invention.
Figure 22:
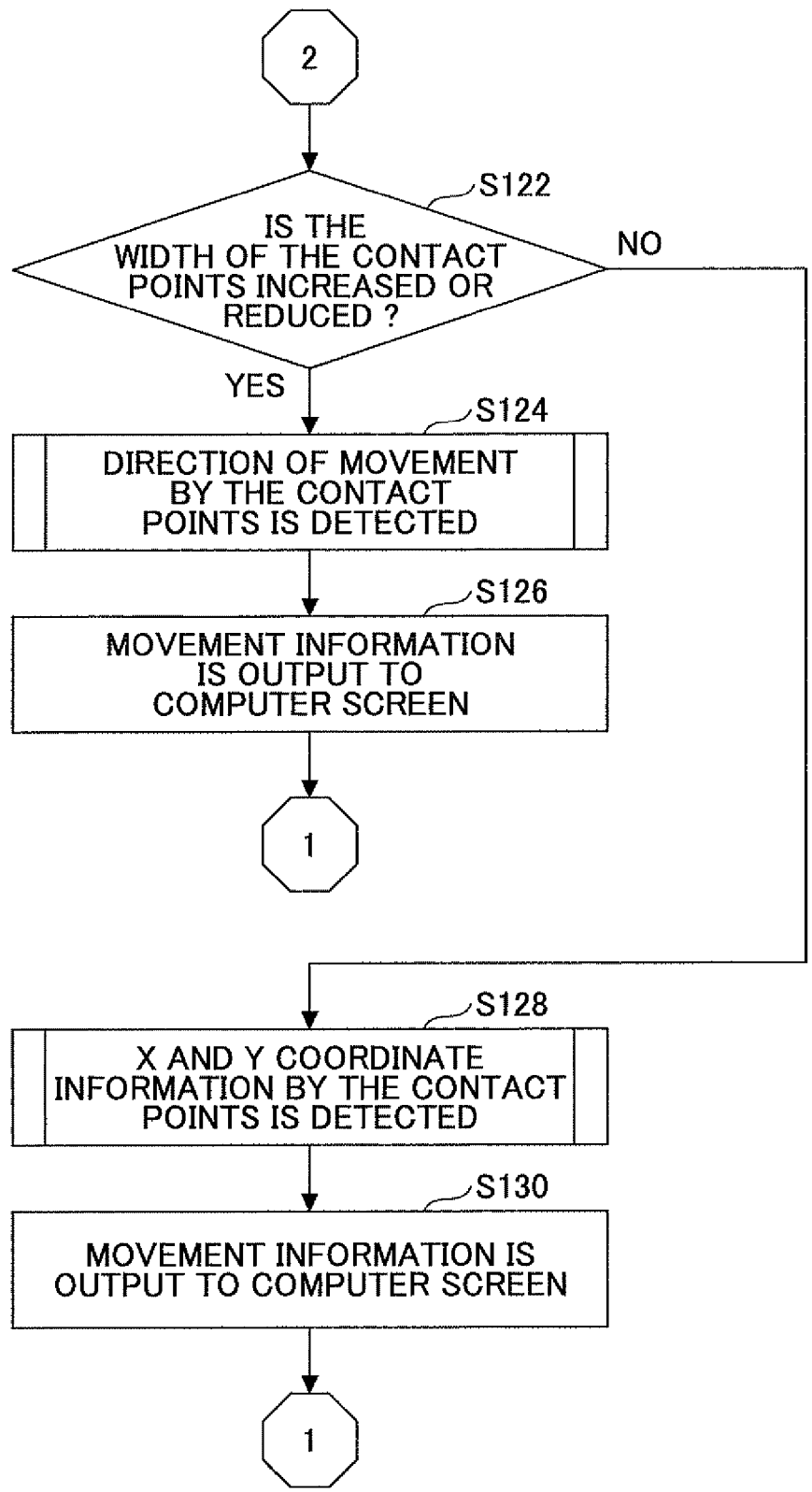
FIG. 22 is a flowchart for explaining the coordinates detecting method of the sixth embodiment.

FIG. 21 and FIG. 22 are a flowchart for explaining the coordinates detecting method of this embodiment. This procedure is applicable to any of the touch panels of the first to fifth embodiments described above.

Upon start of the procedure, it is determined in step S102 whether the touch panel is turned on. Specifically, it is determined whether the transparent conductive film 30 in the upper electrode substrate of the touch panel and the transparent conductive film 40 in the lower electrode substrate are brought in contact with each other.

When it is determined that the touch panel is turned on, the control progresses to step S104. On the other hand, when it is determined that the touch panel is not turned on, the control progresses to step S102 again. That is, the subsequent procedure is started only when the touch panel is turned on.

Subsequently, in step S104, it is determined whether plural contact points in the touch panel are detected. Specifically, when the plural contact points in the plural split portions of the transparent conductive film 30 are detected, it is determined that the plural contact points in the touch panel are detected, and the control progresses to step S116.

On the other hand, when the plural contact points are not detected, it is determined that only one contact point in the touch panel is detected, and the control progresses to step S106. In the following steps S106-S114, detection of the coordinates of one contact point may be performed similar to the analog resistive-film touch panel according to the related art.

Subsequently, in step S106, an X-direction voltage between the X-axis electrodes is supplied. Specifically, an X-direction voltage between the electrodes 41 and 43 as illustrated in FIG. 7 (which will be the X-axis electrodes) is supplied. The X-axis electrodes 41 and 43 are connected to the transparent conductive film 40 in the lower electrode substrate, and a distribution of an electrical potential in the transparent conductive film 40 in the X-axis direction is generated by the supply of the X-direction voltage.

Subsequently, in step S108, an electric potential of an X coordinate of the contact point is detected. Specifically, the electric potential of the X coordinate of the contact point is read from one of the split portions in the transparent conductive film 30 of the upper electrode substrate contacting the transparent conductive film 40.

Subsequently, in step S110, a Y-direction voltage between the Y-axis electrodes is supplied. Specifically, a Y-direction voltage between the electrodes 42 and 44 as illustrated in FIG. 7 (which will be the Y-axis electrodes) is supplied. The Y-axis electrodes 42 and 44 are connected to the transparent conductive film 40 in the lower electrode substrate, and a distribution of an electrical potential in the transparent conductive film 40 in the Y-axis direction is generated by the supply of the Y-direction voltage.

Subsequently, in step S112, an electric potential of a Y coordinate of the contact point is detected. Specifically, the electric potential of the Y coordinate of the contact point is read from one of the split portions in the transparent conductive film 30 of the upper electrode substrate contacting the transparent conductive film 40.

Subsequently, in step S114, the X and Y coordinate information is output. Specifically, the X and Y coordinates of the contact point are obtained based on the electric potential of the X coordinate and the electric potential of the Y coordinate which are detected in step S108 and step S112, and the X and Y coordinate information is output. If needed, this information is displayed on the screen of a display device of a host computer (not illustrated).

Subsequently, in step S116, it is determined whether the contact points indicate a movement in the upper electrode substrate. Specifically, when it is determined in step S116 that the contact points between the transparent conductive film 40 in the lower electrode substrate and the transparent conductive film 30 in the upper electrode substrate indicate a movement across any of the split portions of the transparent conductive film 30 in the upper electrode substrate, the control progresses to step S118.

On the other hand, when it is determined in step S116 that the contact points do not indicate a movement across the split portions of the transparent conductive film 30 in the upper electrode substrate, the control progresses to step S122.

Subsequently, in step S118, a direction of a movement by the contact points is detected. Specifically, the direction of the movement by the contact points between the transparent conductive film 30 in the upper electrode substrate and the transparent conductive film 40 in the lower electrode substrate is detected. This detection will be described in detail later.

Subsequently, in step S120, the movement information is output to the display device of the host computer (not illustrated) based on the information obtained in step S118. The control progresses to step S102.

Subsequently, in step S122, it is determined whether the spacing between the contact points is increased or reduced. Specifically, when it is determined in step S122 that the spacing between the contact points between the transparent conductive film 40 in the lower electrode substrate and the transparent conductive film 30 in the upper electrode substrate is increased or reduced across any of the split portions of the transparent conductive film 30 in the upper electrode substrate, the control progresses to step S124.

On the other hand, when it is determined in step S122 that the spacing between the contact points is not increased or reduced across the split portions of the transparent conductive film 30 in the upper electrode substrate, the control progresses to step S128.

Subsequently, in step S124, a direction of a movement by the contact points is detected. Specifically, the direction of the movement by the contact points between the transparent conductive film 30 in the upper electrode substrate and the transparent conductive film 40 in the lower electrode substrate is detected. This detection will be described later.

Subsequently, in step S126, the movement information is output to the display device of the host computer (not illustrated) based on the information obtained in step S124. The control progresses to step S102.

Subsequently, in step S128, the positional information of the contact points is detected. Specifically, the positional information of the contact points between the transparent conductive film 30 in the upper electrode substrate and the transparent conductive film 40 in the lower electrode substrate is detected. This detection will be described later.

Subsequently, in step S130, the movement information is output to the display device of the host computer (not illustrated) based on the information obtained in step S128. The control progresses to step S102.

In the present embodiment, the determination in step S104 is performed as described above. Alternatively, this determination may be performed based on the control by receiving of a communication command, switching of dip switches, etc.

Next, a description will be given of the procedure to detect the positional information of the contact points, which is performed in step S128, with reference to FIG. 23. The procedure to detect the positional information of the contact points in step S202 in FIG. 23 corresponds to step S128 in FIG. 22.

As an example, the following description is given for a case in which the transparent conductive film 30 of the upper electrode substrate is divided into four split conductive portions (which will be referred to as areas 1, 2, 3 and 4). However, even if the number of split conductive portions is increased, the same procedure may be applicable.

Figure 23:
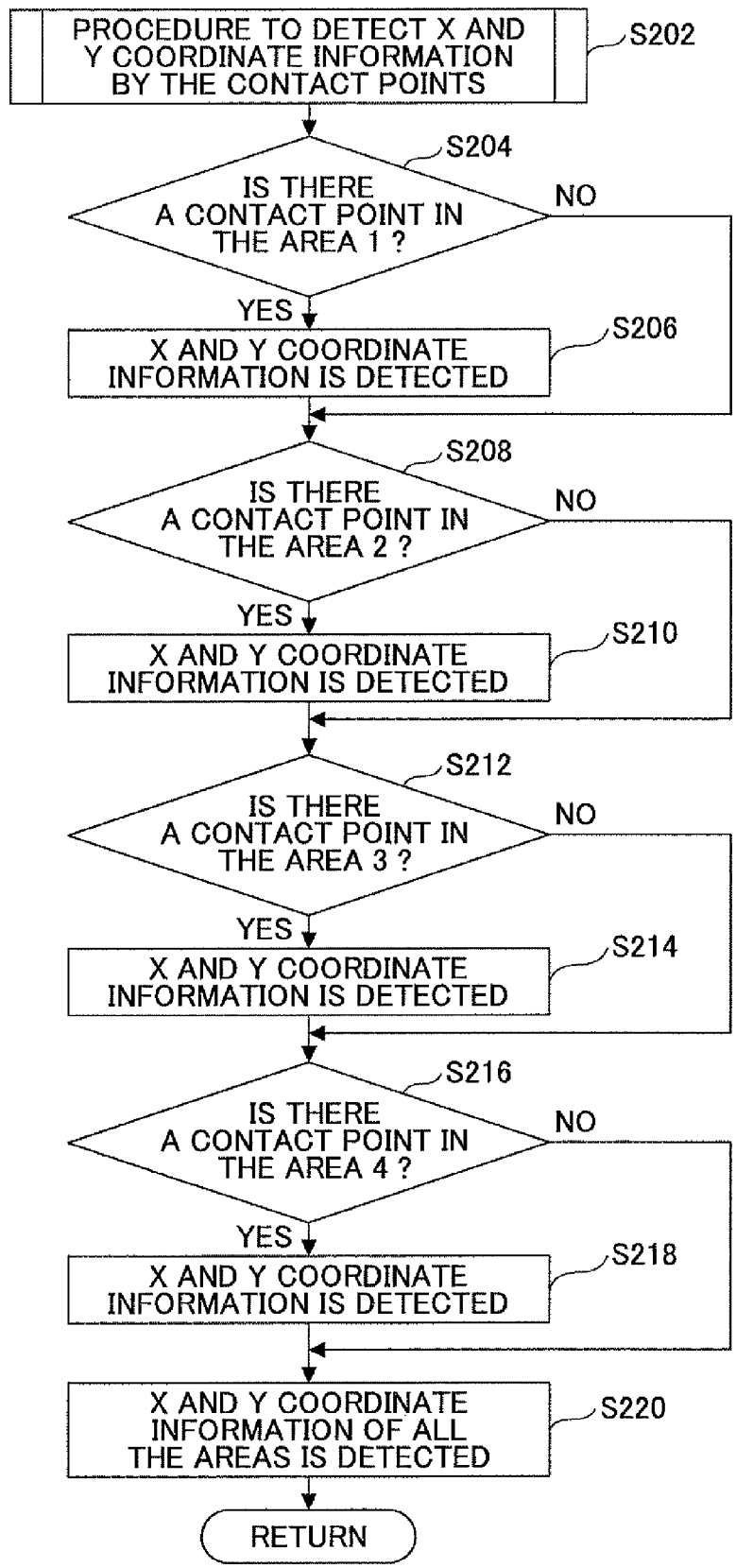
FIG. 23 is a flowchart for explaining the coordinates detecting method of the sixth embodiment.

Upon start of the procedure of FIG. 23, it is determined in step S204 whether there is a contact point in the area 1 which is one of the split conductive portions of the transparent conductive film 30. When there is a contact point in the area 1, the control progresses to step S206. When there is no contact point in the area 1, the control progresses to step S208.

Subsequently, in step S206, the X and Y coordinate information of the contact point in the area 1 is detected. Specifically, detection of the area 1 of the transparent conductive film 30 in which the transparent conductive film 30 and the transparent conductive film 40 are in contact with each other, and detection of the X and Y coordinate information of the contact point in the area 1 based on the potential distribution generated in the transparent conductive film 40 are performed.

Subsequently, in step S208, it is determined whether there is a contact point in the area 2 which is one of the split conductive portions of the transparent conductive film 30. When there is a contact point in the area 2, the control progresses to step S210. When there is no contact point in the area 2, the control progresses to step S212.

Subsequently, in step S210, the X and Y coordinate information of the contact point in the area 2 is detected. Specifically, detection of the area 2 of the transparent conductive film 30 in which the transparent conductive film 30 and the transparent conductive film 40 are in contact with each other, and detection of the X and Y coordinate information of the contact point in the area 2 based on the potential distribution generated in the transparent conductive film 40 are performed.

Subsequently, in step S212, it is determined whether there is a contact point in the area 3 which is one of the split conductive portions of the transparent conductive film 30. When there is a contact point in the area 3, the control progresses to step S214. When there is no contact point in the area 3, the control progresses to step S216.

Subsequently, in step S214, the X and Y coordinate information of the contact point in the area 3 is detected. Specifically, detection of the area 3 of the transparent conductive film 30 in which the transparent conductive film 30 and the transparent conductive film 40 are in contact with each other, and detection of the X and Y coordinate information of the contact point in the area 3 based on the potential distribution generated in the transparent conductive film 40 are performed.

Subsequently, in step S216, it is determined whether there is a contact point in the area 4 which is one of the split conductive portions of the transparent conductive film 30. When there is a contact point in the area 4, the control progresses to step S218. When there is no contact point in the area 4, the control progresses to step S220.

Subsequently, in step S218, the X and Y coordinate information of the contact point in the area 4 is detected. Specifically, detection of the area 4 of the transparent conductive film 30 in which the transparent conductive film 30 and the transparent conductive film 40 are in contact with each other, and detection of the X and Y coordinate information of the contact point in the area 4 based on the potential distribution generated in the transparent conductive film 40 are performed.

Subsequently, in step S220, the X and Y coordinate information of all the contact points in the areas 1 to 4 is detected. Then, the control is returned to the step S130 in the procedure of FIG. 22.

Next, a description will be given of the procedure to detect a direction of the movement by the contact points in the step S118 in FIG. 21 and the step S124 in FIG. 22, with reference to FIG. 24. The procedure to detect a direction of the movement by the contact points in step S302 in FIG. 24 corresponds to the step S118 and the step S124.

As an example, the following description is given for a case in which the transparent conductive film 30 is divided into five split conductive portions (which will be referred to as conductive portions A, B, C, D and E).

Figure 24:
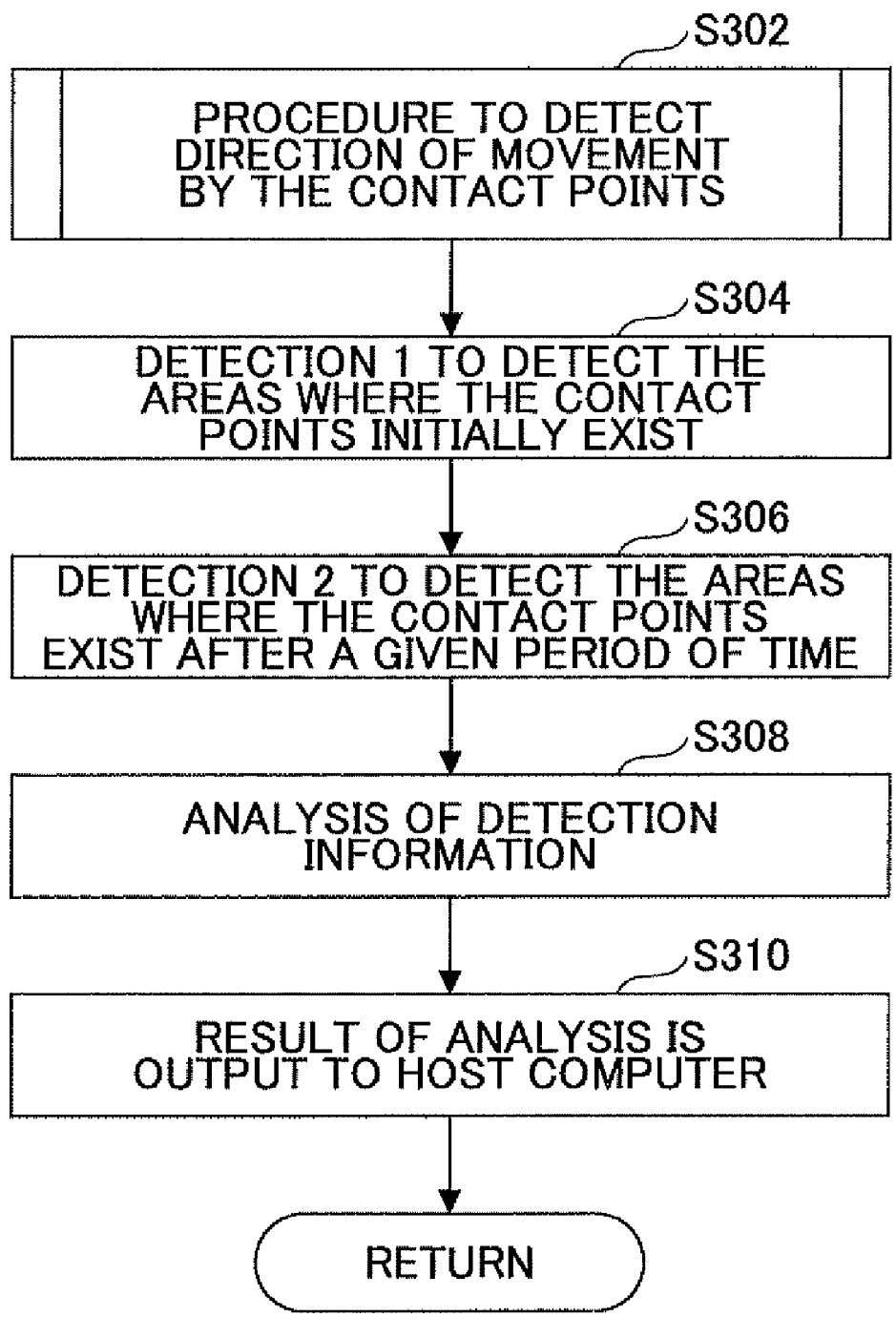
FIG. 24 is a flowchart for explaining the coordinates detecting method of the sixth embodiment.

Upon start of the procedure of FIG. 24, in step S304, the detection 1 to detect the areas of the contact points in the touch panel is performed.

After a predetermined period of time has elapsed, in step S306, the detection 2 to detect the areas of the contact points in the touch panel is performed.

Subsequently, in step S308, analysis of the area detection information is performed. For example, if the user depresses the upper electrode substrate of the touch panel by the two fingers and shifts the fingers on the upper electrode substrate, then a change in the detection result between the area detection 1 in step S304 and the area detection 2 in step S306 arises. This change is detected and the area detection information is analyzed in step S308 based on the detected change in the detection result between the detection 1 and the detection 2.

Subsequently, in step S310, the result of the analysis is output to the host computer (not illustrated). Then, the control is returned to the step S120 in the procedure of FIG. 21 or the step S130 in the procedure of FIG. 22.

Next, an example of the procedure to detect a direction of the movement by the contact points as illustrated in FIG. 24 will be described with reference to FIG. 25.

Figure 25:
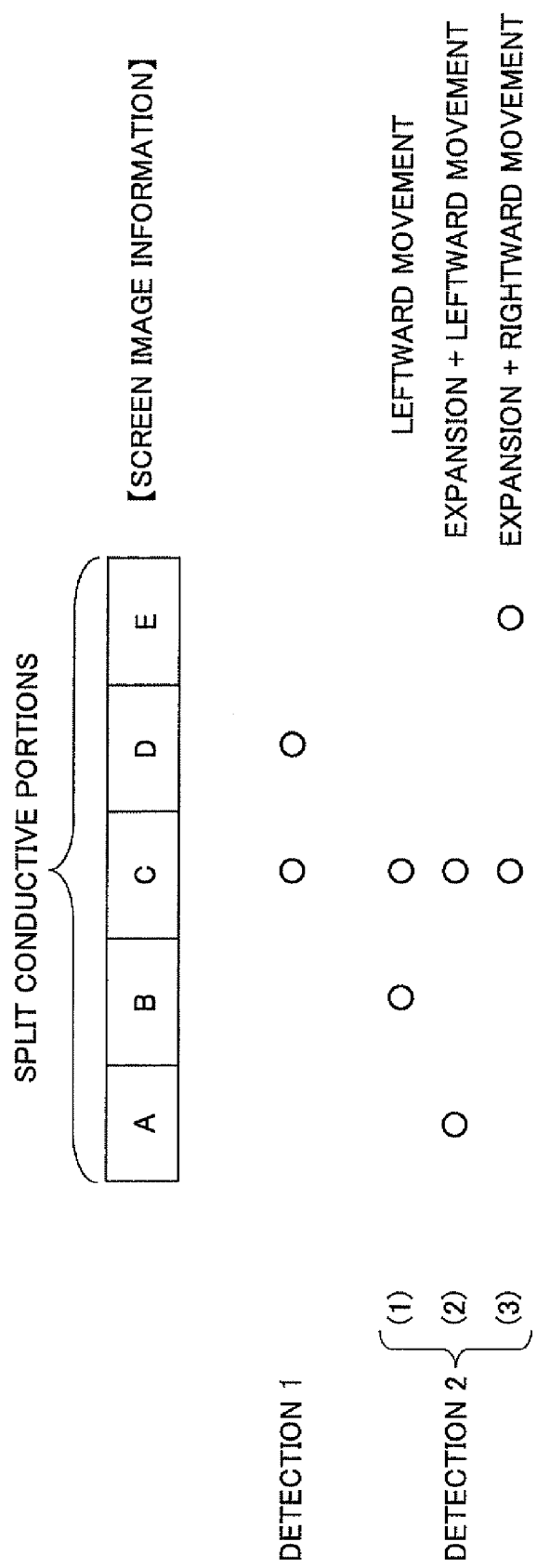
FIG. 25 is a diagram for explaining the coordinates detecting method of the sixth embodiment.

As illustrated in FIG. 25, the result of the area detection 1 in the step S304 indicates that the user has depressed the upper electrode substrate by the fingers at the conductive portions C and D of the transparent conductive film 30.

First, it is assumed that the result of the area detection 2 in the step S306 indicates that the user has depressed the upper electrode substrate by the fingers at the conductive portions B and C of the transparent conductive film 30, as indicated in (1) of the detection 2 in FIG. 25. In this case, the result of the analysis in the step S308 indicates that the spacing between the two fingers remains unchanged and the fingers are moved leftward on the upper electrode substrate. The result of the analysis is reported to the host computer (not illustrated) in the step S310, and the host computer performs a scroll process to move the image currently displayed on the display device to the left, based on the analysis result.

Second, it is assumed that the result of the area detection 2 in the step S306 indicates that the user has depressed the upper electrode substrate by the fingers at the conductive portions A and C of the transparent conductive film 30, as indicated in (2) of the detection 2 in FIG. 25. In this case, the result of the analysis in the step S308 indicates that the spacing between the two fingers is increased and the fingers are moved leftward on the upper electrode substrate. The result of the analysis is reported to the host computer (not illustrated) in the step S310, and the host computer expands the size of the image currently displayed on the display device and performs a scroll process to move the image to the left, based on the analysis result.

Third, it is assumed that the result of the area detection 2 in the step S306 indicates that the user has depressed the upper electrode substrate by the fingers at the conductive portions C and E of the transparent conductive film 30, as indicated in (3) of the detection 2 in FIG. 25. In this case, the result of the analysis in the step S308 indicates that the spacing between the two fingers is increased and the fingers are moved rightward on the upper electrode substrate. The result of the analysis is reported to the host computer (not illustrated) in the step S310, and the host computer increases the size of the image currently displayed on the display device and performs a scroll process to move the image to the right, based on the analysis result.

Next, another example of the procedure of FIG. 24 to detect a direction of the movement by the contact points will be described with reference to FIG. 26.

As illustrated in FIG. 26, the result of the area detection 1 in the step S304 indicates that the user has depressed the upper electrode substrate by the fingers at the conductive portions B and D of the transparent conductive film 30.

First, it is assumed that the result of the area detection 2 in the step S306 indicates that the user has depressed the upper electrode substrate by the fingers at the conductive portions C and E of the transparent conductive film 30, as indicated in (1) of the detection 2 in FIG. 26. In this case, the result of the analysis in the step S308 indicates that the spacing between the two fingers remains unchanged and the fingers are moved rightward on the upper electrode substrate. The result of the analysis is reported to the host computer (not illustrated) in the step S310, and the host computer performs a scroll process to move the image currently displayed on the display device to the right, based on the analysis result.

Second, it is assumed that the result of the area detection 2 in the step S306 indicates that the user has depressed the upper electrode substrate by the fingers at the conductive portions B and C of the transparent conductive film 30, as illustrated in (2) of the detection 2 in FIG. 26. In this case, the result of the analysis in the step S308 indicates that the spacing between the two fingers is reduced and the fingers are moved leftward on the upper electrode substrate. The result of the analysis is reported to the host computer (not illustrated) in the step S310, and the host computer reduces the size of the image currently displayed on the display device and performs a scroll process to move the image to the left, based on the analysis result.

Third, it is assumed that the result of the area detection 2 in the step S306 indicates that the user has depressed the upper electrode substrate by the fingers at the conductive portions D and E of the transparent conductive film 30, as indicated in (3) of the detection 2 in FIG. 26. In this case, the result of the analysis in the step S308 indicates that the spacing between the two fingers is reduced and the fingers are moved rightward on the upper electrode substrate. The result of this analysis is reported to the host computer (not illustrated) in step S310, and the host computer reduces the size of the image currently displayed on the display device and performs a scroll process to move the image to the right, based on the analysis result.

The present invention is applicable to a five-wire type resistive-film touch panel, and it is useful especially when a display device of an information processing apparatus is produced with a five-wire type resistive-film touch panel. Examples of the information processing apparatus in this case may include a cellular phone, an information personal digital assistant (PDA), a portable music player, a portable image player, a portable browser, a one-segment tuner, an electronic dictionary, a car-navigation system, a computer, a POS terminal, a stock control end, an ATM, various computer terminals for multimedia services, etc.

According to at least one of the foregoing embodiments of the invention, even when the touch panel is depressed at plural contact points simultaneously, the touch panel and the coordinates detecting method using the touch panel are able to detect the respective positions of the contact points. According to at least one of the foregoing embodiments of the invention, even when the contact point is moved on the touch panel, the touch panel and the coordinates detecting method using the touch panel are able to detect a position of the contact point after the movement.

The present invention is not limited to the specifically disclosed embodiments, and variations and modifications may be made without departing from the scope of the present invention.

The present application is based on Japanese patent application No. 2009-009367, filed on Jan. 19, 2009, the entire contents of which are incorporated herein by reference in their entirety.

What is claimed is:

1. A touch panel comprising:
a lower conductive film of a transparent conductive material formed on a substrate of an insulating material;

four electrodes disposed in edge portions of four sides of the lower conductive film in order to generate a potential distribution in the lower conductive film; and an upper conductive film of the transparent conductive material disposed over the lower conductive film so that the upper conductive film and the lower conductive film are opposed to each other to detect an electric potential in the lower conductive film when the upper conductive film is in contact with the lower conductive film, wherein the upper conductive film includes a plurality of split portions containing no transparent conductive material and a plurality of split conductive portions divided by the plurality of split portions and containing the transparent conductive material, and wherein the touch panel is arranged to detect an electric potential of each of contact points in the plurality of split conductive portions when the upper and lower conductive films are brought in contact with each other at the contact points, so that respective coordinates of the contact points are detected based on the detected electrical potentials.

2. The touch panel according to claim 1, wherein the upper conductive film has a rectangular shape and is divided into four split conductive portions by the plurality of split portions which are formed by removing the upper conductive film and contain no transparent conductive material.

3. The touch panel according to claim 2, wherein the plurality of split portions are formed along either diagonal lines of the upper conductive film or lines parallel to the four sides of the upper conductive film, and the upper conductive film is divided into the four split conductive portions by the plurality of split portions.

4. The touch panel according to claim 1, wherein the plurality of split portions are formed to intersect each other at a central location of the upper conductive film.

5. The touch panel according to claim 1, wherein the upper conductive film includes a split portion at a central location of the upper conductive film, the split portion being formed by removing the upper conductive film.

6. The touch panel according to claim 1, wherein the upper conductive film includes a central conductive portion at a central location of the upper conductive film.

7. The touch panel according to claim 6, wherein the central conductive portion at the central location of the upper conductive film is formed with a lead conductive portion extending from the central conductive portion to an end of the upper conductive film.

8. The touch panel according to claim 7, wherein an insulating layer is provided on the lead conductive portion.

9. The touch panel according to claim 1, wherein each of the plurality of split portions has a comb shape or a sawtooth shape.

10. The touch panel according to claim 1 wherein the lower conductive film is made of an opaque conductive material which light does not penetrate, instead of the transparent conductive material.

11. The touch panel according to claim 1, wherein the upper conductive film is made of an opaque conductive material which light does not penetrate, instead of the transparent conductive material.

12. The touch panel according to claim 1, wherein both the upper conductive film and the lower conductive film are made of an opaque conductive material which light does not penetrate, instead of the transparent conductive material.

13. A coordinates detecting method comprising:
providing a touch panel including a lower conductive film of a transparent conductive material formed on a substrate of an insulating material, four electrodes disposed in edge portions of four sides of the lower conductive film in order to generate a potential distribution in the lower conductive film, and an upper conductive film of the transparent conductive material disposed over the lower conductive film so that the upper and lower conductive films are opposed to each other, the upper conductive film including split portions containing no transparent conductive material and split conductive portions divided by the split portions and containing the transparent conductive material;

detecting an electric potential of each of contact points in the split conductive portions when the upper and lower conductive films are brought in contact with each other at the contact points; and detecting respective coordinates of the contact points based on the detected electrical potentials.

14. The coordinates detecting method of claim 13, further comprising determining whether plural contact points between the upper conductive film and the lower conductive film are detected, wherein, when it is determined that the plural contact points are detected, respective coordinates of the plural contact points are detected.

15. The coordinates detecting method of claim 13, wherein, when the contact points indicate a movement, at least one of a direction of the movement by the contact points and the coordinates of the contact points is detected.

* * * * *